US010462746B2

United States Patent
Yu et al.

(10) Patent No.: US 10,462,746 B2
(45) Date of Patent: Oct. 29, 2019

(54) SETTING INFORMATION CONFIGURATION METHOD, TERMINAL, AND SERVER

(71) Applicant: Huawei Technologies Co., Ltd., Shenzhen (CN)

(72) Inventors: Yanhui Yu, Shanghai (CN); Cong Xiao, Shanghai (CN); Shizheng Yang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/805,942

(22) Filed: Nov. 7, 2017

(65) Prior Publication Data
US 2018/0070314 A1   Mar. 8, 2018

Related U.S. Application Data

(63) Continuation of application No. PCT/CN2015/078607, filed on May 8, 2015.

(51) Int. Cl.
*H04W 52/02* (2009.01)
*H04M 1/725* (2006.01)

(52) U.S. Cl.
CPC ... *H04W 52/0251* (2013.01); *H04M 1/72569* (2013.01); *Y02D 70/00* (2018.01);
(Continued)

(58) Field of Classification Search
CPC .......... H04W 52/0251; H04M 1/72569; Y02D 70/26; Y02D 70/14; Y02D 70/142;
(Continued)

(56) References Cited

U.S. PATENT DOCUMENTS

2001/0056307 A1   12/2001   Theimer
2003/0005362 A1*  1/2003   Miller ............... G06F 11/0727
                                                          714/27
(Continued)

FOREIGN PATENT DOCUMENTS

CN   101404826 A      4/2009
CN   102014371   *    4/2011
(Continued)

OTHER PUBLICATIONS

Machine Translation and Abstract of Chinese Publication No. CN101404826, Apr. 8, 2009, 7 pages.
(Continued)

*Primary Examiner* — Edward F Urban
*Assistant Examiner* — Angelica M Perez
(74) *Attorney, Agent, or Firm* — Conley Rose, P.C.

(57) ABSTRACT

A setting information configuration method, a terminal, and a server, belong to the field of information processing technologies, where the method includes obtaining an analysis result, displaying improper setting information of a user and a setting suggestion, receiving a setting instruction entered by the user according to the displayed improper setting information and setting suggestion, and configuring local setting information according to the setting instruction. Because the local setting information can be analyzed and the improper setting information and the setting suggestion that are obtained by analysis can be displayed, the user can purposefully configure the local setting information. Therefore, setting information configuration flexibility is relatively high.

18 Claims, 13 Drawing Sheets

(52) U.S. Cl.
CPC .............. *Y02D 70/10* (2018.01); *Y02D 70/14* (2018.01); *Y02D 70/142* (2018.01); *Y02D 70/144* (2018.01); *Y02D 70/164* (2018.01); *Y02D 70/26* (2018.01)

(58) Field of Classification Search
CPC .... Y02D 70/00; Y02D 70/144; Y02D 70/164; Y02D 70/10
See application file for complete search history.

(56) References Cited

U.S. PATENT DOCUMENTS

| | | | |
|---|---|---|---|
| 2013/0227031 A1 | 8/2013 | Wells et al. | |
| 2014/0201675 A1 | 7/2014 | Joo et al. | |
| 2014/0281664 A1* | 9/2014 | Dudai | G06F 11/0793 714/3 |
| 2016/0139738 A1* | 5/2016 | Wever | G06F 3/04847 715/810 |

FOREIGN PATENT DOCUMENTS

| | | |
|---|---|---|
| CN | 102014371 A | 4/2011 |
| CN | 103200310 A | 7/2013 |
| CN | 103929547 A | 7/2014 |
| CN | 104010080 A | 8/2014 |
| CN | 104023121 A | 9/2014 |
| DE | 10021389 A1 | 11/2001 |
| EP | 2493161 A1 | 8/2012 |

OTHER PUBLICATIONS

Machine Translation and Abstract of Chinese Publication No. CN102014371, Apr. 13, 2011, 10 pages.
Machine Translation and Abstract of Chinese Publication No. CN103929547, Jul. 16, 2014, 12 pages.
Machine Translation and Abstract of Chinese Publication No. CN104023121, Sep. 3, 2014, 41 pages.
Foreign Communication From a Counterpart Application, PCT Application No. PCT/CN2015/078607, English Translation of International Search Report dated Jan. 26, 2016, 2 pages.
Foreign Communication From a Counterpart Application, PCT Application No. PCT/CN2015/078607, English Translation of Written Opinion dated Jan. 26, 2016, 5 pages.
Foreign Communication From a Counterpart Application, European Application No. 15891467.1, Extended European Search Report dated May 4, 2018, 10 pages.
Machine Translation and Abstract of Chinese Publication No. CN103200310, Jul. 10, 2013, 16 pages.
Foreign Communication From a Counterpart Application, Chinese Application No. 201580029668.1, Chinese Office Action dated Nov. 1, 2018, 9 pages.
Machine Translation and Abstract of Chinese Publication No. CN104010080, Aug. 27, 2014, 11 pages.
Foreign Communication From a Counterpart Application, Chinese Application No. 201580029668.1, Chinese Office Action dated May 17, 2019, 5 pages.

* cited by examiner

CONT.
FROM
FIG. 4A

408. The terminal obtains an analysis result, where the analysis result includes at least the improper setting information of the user and the setting suggestion 409. The terminal displays the improper setting information of the user and the setting suggestion 410. The terminal receives a setting instruction entered by the user according to the displayed improper setting information and setting suggestion 411. The terminal configures the local setting information according to the setting instruction

CONT.
FROM
FIG. 4A

FIG. 4B

SETTING INFORMATION CONFIGURATION METHOD, TERMINAL, AND SERVER

CROSS-REFERENCE TO RELATED APPLICATION

This application is a continuation of International Patent Application No. PCT/CN2015/078607 filed on May 8, 2015, which is hereby incorporated by reference in its entirety.

TECHNICAL FIELD

The present disclosure relates to the field of information processing technologies, and in particular, to a setting information configuration method, a terminal, and a server.

BACKGROUND

With development of modern science and technology, an increasing quantity of users use mobile terminals. Different setting options are generally provided on a mobile terminal to adapt to operation habits of different users. For example, a setting option is a power consumption setting option. The power consumption setting option may include options of whether to disable a wireless network, whether to disable BLUETOOTH, and the like. Setting information corresponding to the power consumption setting option is configured such that power consumed when a user operates a mobile terminal can be reduced. Therefore, a battery life span can be prolonged. Therefore, how to configure setting information of the mobile terminal is the key to achieving an optimal use effect of the mobile terminal.

Two methods are used to configure setting information in a related technology.

In a first method, when a configuration instruction entered by a user is detected, a currently configurable option interface is displayed according to the configuration instruction. The option interface includes several fixed configurable options. A setting instruction entered by the user on the option interface is obtained, and the setting information is configured according to the setting instruction.

In a second method, if it is detected that the setting information currently needs to be configured, configurable setting information may be automatically configured in a configuration manner preset by a terminal.

In a process of implementing the present disclosure, the inventor finds that at least the following problems exist in other approaches.

In the first method, the user can configure the setting information only according to the several fixed configurable options on the option interface, and the configurable options are generally preset instead of being set according to an operation habit of the user. Therefore, the user cannot purposefully configure the setting information according to the operation habit of the user. In the second method, the mobile terminal automatically configures the setting information in several fixed configuration manners, and a configuration process does not need to be completed by the user. Therefore, the user cannot purposefully configure the setting information according to an operation habit of the user. Therefore, setting information configuration flexibility is relatively poor in the foregoing two methods.

SUMMARY

To resolve the problems in the other approaches, embodiments of the present disclosure provide a setting information configuration method, a terminal, and a server. The technical solutions are as follows.

According to a first aspect, a setting information configuration method is provided, where the method includes obtaining an analysis result, where the analysis result is obtained after local setting information is analyzed according to an improper setting information set, the analysis result includes at least improper setting information of a user and a setting suggestion, and the improper setting information is setting information that causes negative impact on performance of a terminal, displaying the improper setting information of the user and the setting suggestion, receiving a setting instruction entered by the user according to the displayed improper setting information and setting suggestion, and configuring the local setting information according to the setting instruction.

With reference to the first aspect, in a first possible implementation manner of the first aspect, obtaining an analysis result includes uploading the local setting information to a server and receiving an analysis result returned by the server, where the analysis result is obtained after the server analyzes the local setting information according to the improper setting information set, or locally analyzing the local setting information according to the improper setting information set to obtain a corresponding analysis result.

With reference to the first possible implementation manner of the first aspect, in a second possible implementation manner of the first aspect, locally analyzing the local setting information according to the improper setting information set to obtain a corresponding analysis result includes matching the local setting information with a locally stored improper setting information set, where the improper setting information set includes at least one piece of improper setting information, setting the matching information as improper setting information of the user when matching information exists between the local setting information and the improper setting information set, and querying, according to a correspondence between improper setting information and a setting suggestion, a setting suggestion corresponding to the improper setting information of the user.

With reference to the second possible implementation manner of the first aspect, in a third possible implementation manner of the first aspect, before matching the local setting information with a locally stored improper setting information set, the method further includes uploading setting information to the server at an interval of a preset period, and receiving an improper setting information set returned by the server according to the setting information and locally storing the improper setting information set.

With reference to the first aspect, in a fourth possible implementation manner of the first aspect, when the improper setting information is that a screen luminance value is greater than a first preset threshold, the setting suggestion is lowering the screen luminance value, when the improper setting information is that a quantity of calls during which BLUETOOTH is enabled is greater than a second preset threshold, the setting suggestion is reducing the quantity of calls during which BLUETOOTH is enabled, and when the improper setting information is that a quantity of calls during which a wireless network is enabled is greater than a third preset threshold, the setting suggestion is reducing the quantity of calls during which a wireless network is enabled.

With reference to the first aspect, in a fifth possible implementation manner of the first aspect, the method further includes obtaining a recommended setting information set of the local setting information according to the local setting information, where the recommended setting information set includes at least one piece of recommended setting information, displaying a reminder of whether to accept the recommended setting information set, and configuring the local setting information according to the recommended setting information set when an instruction of the user for accepting the recommended setting information set is detected and it is identified that a current scenario is a preset scenario.

According to a second aspect, a setting information configuration method is provided, where the method includes collecting setting information and feature information of a terminal, where the feature information includes at least a terminal model, performing cluster analysis according to different feature information to classify the setting information of the terminal to obtain a recommended setting information set and an improper setting information set of each category, where improper setting information in the improper setting information set is setting information that causes negative impact on performance of the terminal, and configuring the setting information of the terminal according to a setting information set of each category, where the setting information set includes a recommended setting information set and an improper setting information set.

With reference to the second aspect, in a first possible implementation manner of the second aspect, before configuring the setting information of the terminal according to a setting information set of each category, the method further includes collecting setting information of each category, and updating the corresponding recommended setting information set according to the collected setting information of each category, where configuring the setting information of the terminal according to a setting information set of each category includes configuring the setting information of the terminal according to the improper setting information set of each category and the updated recommended setting information set.

With reference to the second aspect, in a second possible implementation manner of the second aspect, updating the corresponding recommended setting information set according to the collected setting information of each category includes sorting the collected setting information of each category and determining setting information that meets a preset counter condition, according to a preset counter, and updating each piece of corresponding recommended setting information in the recommended setting information set according to each piece of setting information that meets the preset counter condition.

With reference to the second aspect, in a third possible implementation manner of the second aspect, configuring the setting information of the terminal according to a setting information set of each category includes receiving local setting information uploaded by the terminal, determining a category corresponding to the local setting information, determining an improper setting information set of the category corresponding to the local setting information, matching the local setting information with the improper setting information set, setting the matching information as improper setting information of a user when matching information exists between the local setting information and the improper setting information set, querying, according to a correspondence between improper setting information and a setting suggestion, a setting suggestion corresponding to the improper setting information of the user, and returning the improper setting information of the user and the setting suggestion to the terminal such that the terminal configures the setting information according to the improper setting information and the setting suggestion.

With reference to the second aspect, in a fourth possible implementation manner of the second aspect, configuring the setting information of the terminal according to a setting information set of each category includes receiving local setting information uploaded by the terminal, determining a category corresponding to the local setting information, determining a recommended setting information set of the category corresponding to the local setting information, and sending the recommended setting information set to the terminal such that the terminal configures the setting information according to the recommended setting information set.

With reference to the second aspect, in a fifth possible implementation manner of the second aspect, configuring the setting information of the terminal according to a setting information set of each category includes receiving setting information uploaded by the terminal according to a preset period, determining a category corresponding to the setting information uploaded by the terminal, determining an improper setting information set of the category corresponding to the setting information uploaded by the terminal, and sending the improper setting information set to the terminal such that after storing the improper setting information, the terminal configures the setting information according to the stored improper setting information set.

According to a third aspect, a terminal is provided, where the terminal includes a first obtaining module configured to obtain an analysis result, where the analysis result is obtained after local setting information is analyzed according to an improper setting information set, the analysis result includes at least improper setting information of a user and a setting suggestion, and the improper setting information is setting information that causes negative impact on performance of the terminal, a first display module configured to display the improper setting information of the user and the setting suggestion, a receiving module configured to receive a setting instruction entered by the user according to the displayed improper setting information and setting suggestion, and a first configuration module configured to configure the local setting information according to the setting instruction.

With reference to the third aspect, in a first possible implementation manner of the third aspect, the first obtaining module includes a receiving unit configured to upload the local setting information to a server and receive an analysis result returned by the server, where the analysis result is obtained after the server analyzes the local setting information according to the improper setting information set, or an analysis unit configured to locally analyze the local setting information according to the improper setting information set, to obtain a corresponding analysis result.

With reference to the first possible implementation manner of the third aspect, in a second possible implementation manner of the third aspect, the analysis unit includes a matching subunit configured to match the local setting information with a locally stored improper setting information set, where the improper setting information set includes at least one piece of improper setting information, a determining subunit configured to set the matching information as improper setting information of the user when matching information exists between the local setting information and the improper setting information set, and a query subunit configured to query, according to a correspondence between improper setting information and a setting suggestion, a setting suggestion corresponding to the improper setting information of the user.

With reference to the second possible implementation manner of the third aspect, in a third possible implementation manner of the third aspect, the analysis unit further includes an uploading subunit configured to upload setting information to the server at an interval of a preset period, and a receiving subunit configured to receive an improper setting information set returned by the server according to the setting information and locally store the improper setting information set.

With reference to the third aspect, in a fourth possible implementation manner of the third aspect, when the improper setting information is that a screen luminance value is greater than a first preset threshold, the setting suggestion is lowering the screen luminance value, when the improper setting information is that a quantity of calls during which BLUETOOTH is enabled is greater than a second preset threshold, the setting suggestion is reducing the quantity of calls during which BLUETOOTH is enabled, and when the improper setting information is that a quantity of calls during which a wireless network is enabled is greater than a third preset threshold, the setting suggestion is reducing the quantity of calls during which a wireless network is enabled.

With reference to the third aspect, in a fifth possible implementation manner of the third aspect, the terminal further includes a second obtaining module configured to obtain a recommended setting information set of the local setting information according to the local setting information, where the recommended setting information set includes at least one piece of recommended setting information, a second display module configured to display a reminder of whether to accept the recommended setting information set, and a second configuration module configured to configure the local setting information according to the recommended setting information set when an instruction of the user for accepting the recommended setting information set is detected and it is identified that a current scenario is a preset scenario.

According to a fourth aspect, a server is provided, where the server includes a first collection module configured to collect setting information and feature information of a terminal, where the feature information includes at least a terminal model, a first analysis module configured to perform cluster analysis according to different feature information to classify the setting information of the terminal to obtain a recommended setting information set and an improper setting information set of each category, where improper setting information in the improper setting information set is setting information that causes negative impact on performance of the terminal, and a configuration module configured to configure the setting information of the terminal according to a setting information set of each category, where the setting information set includes a recommended setting information set and an improper setting information set.

With reference to the fourth aspect, in a first possible implementation manner of the fourth aspect, the server further includes a second collection module configured to collect setting information of each category, and an update module configured to update the corresponding recommended setting information set according to the collected setting information of each category, where the configuration module is configured to configure the setting information of the terminal according to the improper setting information set of each category and the updated recommended setting information set.

With reference to the first possible implementation manner of the fourth aspect, in a second possible implementation manner of the fourth aspect, the update module is configured to sort the collected setting information of each category and determine setting information that meets a preset counter condition, according to a preset counter, and update each piece of corresponding recommended setting information in the recommended setting information set according to each piece of setting information that meets the preset counter condition.

With reference to the fourth aspect, in a third possible implementation manner of the fourth aspect, the configuration module is configured to receive local setting information uploaded by the terminal, determine a category corresponding to the local setting information, determine an improper setting information set of the category corresponding to the local setting information, match the local setting information with the improper setting information set, set the matching information as improper setting information of a user when matching information exists between the local setting information and the improper setting information set, query, according to a correspondence between improper setting information and a setting suggestion, a setting suggestion corresponding to the improper setting information of the user, and return the improper setting information of the user and the setting suggestion to the terminal such that the terminal configures the setting information according to the improper setting information and the setting suggestion.

With reference to the fourth aspect, in a fourth possible implementation manner of the fourth aspect, the configuration module is configured to receive local setting information uploaded by the terminal, determine a category corresponding to the local setting information, determine a recommended setting information set of the category corresponding to the local setting information, and send the recommended setting information set to the terminal such that the terminal configures the setting information according to the recommended setting information set.

With reference to the fourth aspect, in a fifth possible implementation manner of the fourth aspect, the configuration module is configured to receive setting information uploaded by the terminal according to a preset period, determine a category corresponding to the setting information uploaded by the terminal, determine an improper setting information set of the category corresponding to the setting information uploaded by the terminal, and send the improper setting information set to the terminal such that after storing the improper setting information, the terminal configures the setting information according to the stored improper setting information set.

According to a fifth aspect, a terminal is provided, where the terminal includes a receiver, a transmitter, a memory, and a processor. The receiver, the transmitter, and the memory are separately connected to the processor, the memory stores program code, and the processor is configured to invoke the program code to perform the operations of obtaining an analysis result, where the analysis result is obtained after local setting information is analyzed according to an improper setting information set, the analysis result includes at least improper setting information of a user and a setting suggestion, and the improper setting information is setting information that causes negative impact on performance of the terminal, displaying the improper setting information of the user and the setting suggestion, receiving a setting instruction entered by the user according to the displayed improper setting information and setting suggestion, and configuring the local setting information according to the setting instruction.

With reference to the fifth aspect, in a first possible implementation manner of the fifth aspect, the processor is further configured to upload the local setting information to a server and receive an analysis result returned by the server, where the analysis result is obtained after the server analyzes the local setting information according to the improper setting information set, or locally analyze the local setting information according to the improper setting information set to obtain a corresponding analysis result.

With reference to the first possible implementation manner of the fifth aspect, in a second possible implementation manner of the fifth aspect, the processor is further configured to match the local setting information with a locally stored improper setting information set, where the improper setting information set includes at least one piece of improper setting information, set the matching information as improper setting information of the user when matching information exists between the local setting information and the improper setting information set, and query, according to a correspondence between improper setting information and a setting suggestion, a setting suggestion corresponding to the improper setting information of the user.

With reference to the second possible implementation manner of the fifth aspect, in a third possible implementation manner of the fifth aspect, the processor is further configured to upload setting information to the server at an interval of a preset period, and receive an improper setting information set returned by the server according to the setting information and locally store the improper setting information set.

With reference to the fifth aspect, in a fourth possible implementation manner of the fifth aspect, when the improper setting information is that a screen luminance value is greater than a first preset threshold, the setting suggestion is lowering the screen luminance value, when the improper setting information is that a quantity of calls during which BLUETOOTH is enabled is greater than a second preset threshold, the setting suggestion is reducing the quantity of calls during which BLUETOOTH is enabled, and when the improper setting information is that a quantity of calls during which a wireless network is enabled is greater than a third preset threshold, the setting suggestion is reducing the quantity of calls during which a wireless network is enabled.

With reference to the fifth aspect, in a fifth possible implementation manner of the fifth aspect, the processor is further configured to obtain a recommended setting information set of the local setting information according to the local setting information, where the recommended setting information set includes at least one piece of recommended setting information, display a reminder of whether to accept the recommended setting information set, and configure the local setting information according to the recommended setting information set when an instruction of the user for accepting the recommended setting information set is detected and it is identified that a current scenario is a preset scenario.

According to a sixth aspect, a server is provided, where the server includes a receiver, a transmitter, a memory, and a processor. The receiver, the transmitter, and the memory are separately connected to the processor, the memory stores program code, and the processor is configured to invoke the program code to perform the operations of collecting setting information and feature information of a terminal, where the feature information includes at least a terminal model, performing cluster analysis according to different feature information to classify the setting information of the terminal to obtain a recommended setting information set and an improper setting information set of each category, where improper setting information in the improper setting information set is setting information that causes negative impact on performance of the terminal, and configuring the setting information of the terminal according to a setting information set of each category, where the setting information set includes a recommended setting information set and an improper setting information set.

With reference to the sixth aspect, in a first possible implementation manner of the sixth aspect, the processor is further configured to collect setting information of each category, update the corresponding recommended setting information set according to the collected setting information of each category, and configure the setting information of the terminal according to the improper setting information set of each category and the updated recommended setting information set.

With reference to the first possible implementation manner of the sixth aspect, in a second possible implementation manner of the sixth aspect, the processor is further configured to sort the collected setting information of each category and determine setting information that meets a preset counter condition, according to a preset counter, and update each piece of corresponding recommended setting information in the recommended setting information set according to each piece of setting information that meets the preset counter condition.

With reference to the sixth aspect, in a third possible implementation manner of the sixth aspect, the processor is further configured to receive local setting information uploaded by the terminal, determine a category corresponding to the local setting information, determine an improper setting information set of the category corresponding to the local setting information, match the local setting information with the improper setting information set, set the matching information as improper setting information of a user when matching information exists between the local setting information and the improper setting information set, query, according to a correspondence between improper setting information and a setting suggestion, a setting suggestion corresponding to the improper setting information of the user, and return the improper setting information of the user and the setting suggestion to the terminal such that the terminal configures the setting information according to the improper setting information and the setting suggestion.

With reference to the sixth aspect, in a fourth possible implementation manner of the sixth aspect, the processor is further configured to receive local setting information uploaded by the terminal, determine a category corresponding to the local setting information, determine a recommended setting information set of the category corresponding to the local setting information, and send the recommended setting information set to the terminal such that the terminal configures the setting information according to the recommended setting information set.

With reference to the sixth aspect, in a fifth possible implementation manner of the sixth aspect, the processor is further configured to receive setting information uploaded by the terminal according to a preset period, determine a category corresponding to the setting information uploaded by the terminal, determine an improper setting information set of the category corresponding to the setting information uploaded by the terminal, and send the improper setting information set to the terminal such that after storing the improper setting information, the terminal configures the setting information according to the stored improper setting information set.

The technical solutions provided in the embodiments of the present disclosure bring the following beneficial effects An analysis result obtained after local setting information is analyzed is obtained, improper setting information and a setting suggestion that are in the analysis result are displayed, a setting instruction entered by a user according to the displayed improper setting information and setting suggestion is received, and local setting information is configured according to the setting instruction. Because the local setting information can be analyzed and the improper setting information and the setting suggestion that are obtained by means of analysis can be displayed, the user can purposefully configure the local setting information. Therefore, setting information configuration flexibility is relatively high.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show merely some embodiments of the present disclosure, and a person of ordinary skill in the art may still derive other drawings from these accompanying drawings without creative efforts.

FIG. 4A and FIG. 4B are a flowchart of a setting information configuration method according to another embodiment of the present disclosure;

DESCRIPTION OF EMBODIMENTS

To make the objectives, technical solutions, and advantages of the present disclosure clearer, the following further describes in detail the embodiments of the present disclosure with reference to the accompanying drawings.

Figure 1:
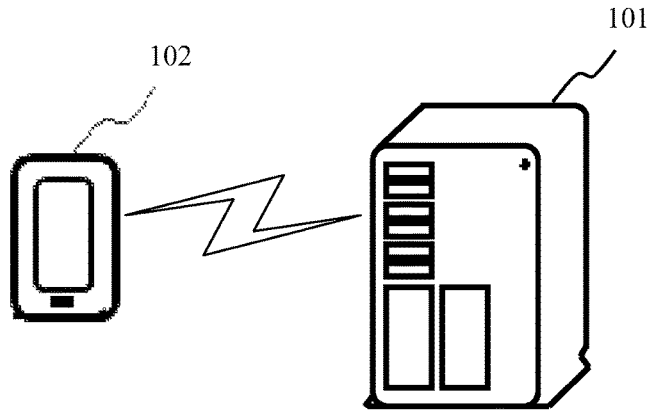
FIG. 1 is a schematic diagram of a network architecture according to an embodiment of the present disclosure.

Referring to FIG. 1, FIG. 1 shows a schematic diagram of a network architecture in a method provided in an embodiment of the present disclosure. As shown in FIG. 1, the network architecture includes a big data platform 101 and a terminal 102. The terminal 102 configures setting information according to different data collected by the big data platform 101. The big data platform 101 includes at least one server.

Figure 2:
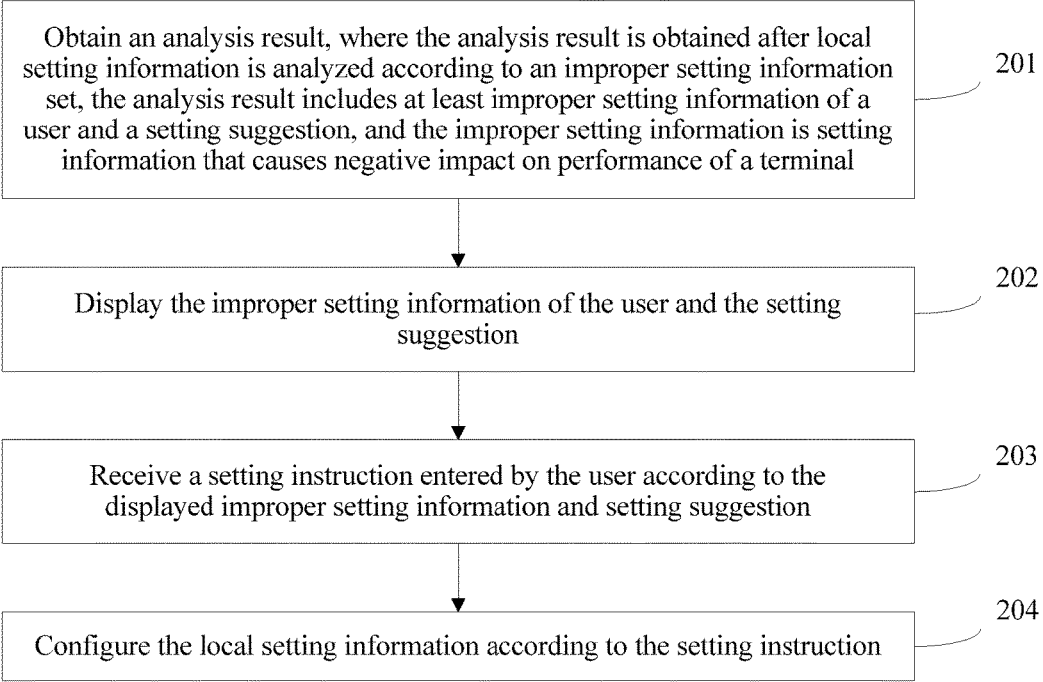
FIG. 2 is a flowchart of a setting information configuration method according to another embodiment of the present disclosure.

An embodiment of the present disclosure provides a setting information configuration method, and the method is used by a terminal. Referring to FIG. 2, a procedure of the method provided in this embodiment includes the following steps.

Step 201: Obtain an analysis result, where the analysis result is obtained after local setting information is analyzed according to an improper setting information set, the analysis result includes at least improper setting information of a user and a setting suggestion, and the improper setting information is setting information that causes negative impact on performance of the terminal.

The setting information is mainly used to describe setting statuses of functions of the terminal when the user uses the terminal, and content of the setting information is not limited in this embodiment. For example, the setting information may include a screen luminance value of the terminal, a quantity of calls within a period and during which WI-FI is enabled, and the like. A length of the period may be set according to a requirement, such as two months. This is not limited in this embodiment, either.

The improper setting information may be setting information that causes negative impact on the performance of the terminal, such as setting information that causes greater power consumption to the terminal. This is not limited in this embodiment. A preset counter value may be preset to measure the performance of the terminal. Impact on the performance of the terminal caused by the setting information can be measured according to the preset counter value. This is not limited in this embodiment. The preset counter value may be average power consumed by the terminal per day, and the like, and content of the preset counter value is not limited in this embodiment. Correspondingly, the improper setting information set may be a setting information set that includes a relatively poor preset counter value and that is selected from pre-collected user setting information.

For example, there are two items of setting information, the screen luminance value of the terminal and the quantity of calls within a period and during which WI-FI is enabled. If a server pre-collects setting information of two users, an example in which a screen luminance value of a first user terminal is 40 percent (%) and a quantity of calls within a period and during which WI-FI is enabled is 100, and a screen luminance value of a second user terminal is 60% and a quantity of calls within a period and during which WI-FI is enabled is 90 is used. A screen has maximum luminance when the screen luminance value is 100%, and the screen has minimum luminance when the screen luminance value is 0%. If average power consumed by a first user per day is 50% and average power consumed by a second user per day is 60%, the setting information of the second user may be collected and used as an improper setting information set because the second user consumes more power per day than the first user on average, that is, a preset counter value for the second user is poorer. It should be noted that only two items of setting information and setting information of two users are used for description in the foregoing example. In actual execution of this embodiment, there may be multiple items of setting information, and there may also be a massive amount of collected user setting information in order to obtain more accurate data. This is not limited in this embodiment.

The setting suggestion is mainly constructive information that is opposite to the improper setting information. For example, when the improper setting information is that the screen luminance value is greater than a first preset threshold, the setting suggestion is lowering the screen luminance value, and when the improper setting information is that a quantity of calls during which BLUETOOTH is enabled is greater than a second preset threshold, the setting suggestion is reducing the quantity of calls during which BLUETOOTH is enabled.

In addition, in subsequent content in this embodiment, an analysis process in this step may be completed by the server or the terminal. Correspondingly, when the analysis process is completed by the server, the setting suggestion may be obtained from a big data platform on a server side. This is not limited in this embodiment. When the analysis process is completed by the terminal, the setting suggestion may be obtained from a terminal side. The setting suggestion stored on the terminal side may be obtained by means of downloading from the server side, and this is not limited in this embodiment.

Step 202: Display the improper setting information of the user and the setting suggestion.

Step 203: Receive a setting instruction entered by the user according to the displayed improper setting information and setting suggestion.

Step 204: Configure the local setting information according to the setting instruction.

A process of configuring the local setting information is mainly resetting the functions of the terminal according to the setting instruction. For example, if the entered setting instruction is adjusting the screen luminance value of the terminal to 53%, the screen luminance value of the terminal may be reset to 53% after the setting instruction is received. Alternatively, if the entered setting instruction is closing several background applications, the background applications corresponding to the setting instruction may be closed after the setting instruction is received.

In the method provided in this embodiment of the present disclosure, an analysis result obtained after local setting information is analyzed is obtained, improper setting information and a setting suggestion that are in the analysis result are displayed, a setting instruction entered by a user according to the displayed improper setting information and setting suggestion is received, and the local setting information is configured according to the setting instruction. Because the local setting information can be analyzed and the improper setting information and the setting suggestion that are obtained by means of analysis can be displayed, the user can purposefully configure the local setting information. Therefore, setting information configuration flexibility is relatively high.

In an optional embodiment, obtaining an analysis result includes uploading the local setting information to the server such that the server analyzes the local setting information according to the improper setting information set and returns an analysis result, and receiving the analysis result returned by the server, where the analysis result is obtained by the server by analyzing the local setting information according to the improper setting information set, or locally analyzing the local setting information according to the improper setting information set to obtain a corresponding analysis result.

In an optional embodiment, locally analyzing the local setting information according to the improper setting information set to obtain a corresponding analysis result includes matching the local setting information with a locally stored improper setting information set, where the improper setting information set includes at least one piece of improper setting information, setting the matching information as improper setting information of the user when matching information exists between the local setting information and the improper setting information set, and querying, according to a correspondence between improper setting information and a setting suggestion, a setting suggestion corresponding to the improper setting information of the user.

In an optional embodiment, before matching the local setting information with a locally stored improper setting information set, the method further includes uploading setting information to the server at an interval of a preset period, and receiving an improper setting information set returned by the server according to the setting information and locally storing the improper setting information set.

In an optional embodiment, when the improper setting information is that the screen luminance value is greater than the first preset threshold, the setting suggestion is lowering the screen luminance value.

In an optional embodiment, when the improper setting information is that the quantity of calls during which BLUETOOTH is enabled is greater than the second preset threshold, the setting suggestion is reducing the quantity of calls during which BLUETOOTH is enabled.

In an optional embodiment, the method further includes obtaining a recommended setting information set of the local setting information according to the local setting information, where the recommended setting information set includes at least one piece of recommended setting information, displaying a reminder of whether to accept the recommended setting information set, and configuring the local setting information according to the recommended setting information set when an instruction of the user for accepting the recommended setting information set is detected and it is identified that a current scenario is a preset scenario.

An optional embodiment of the present disclosure may be formed by any combination of the foregoing optional technical solutions, and details are not described herein.

Figure 3:
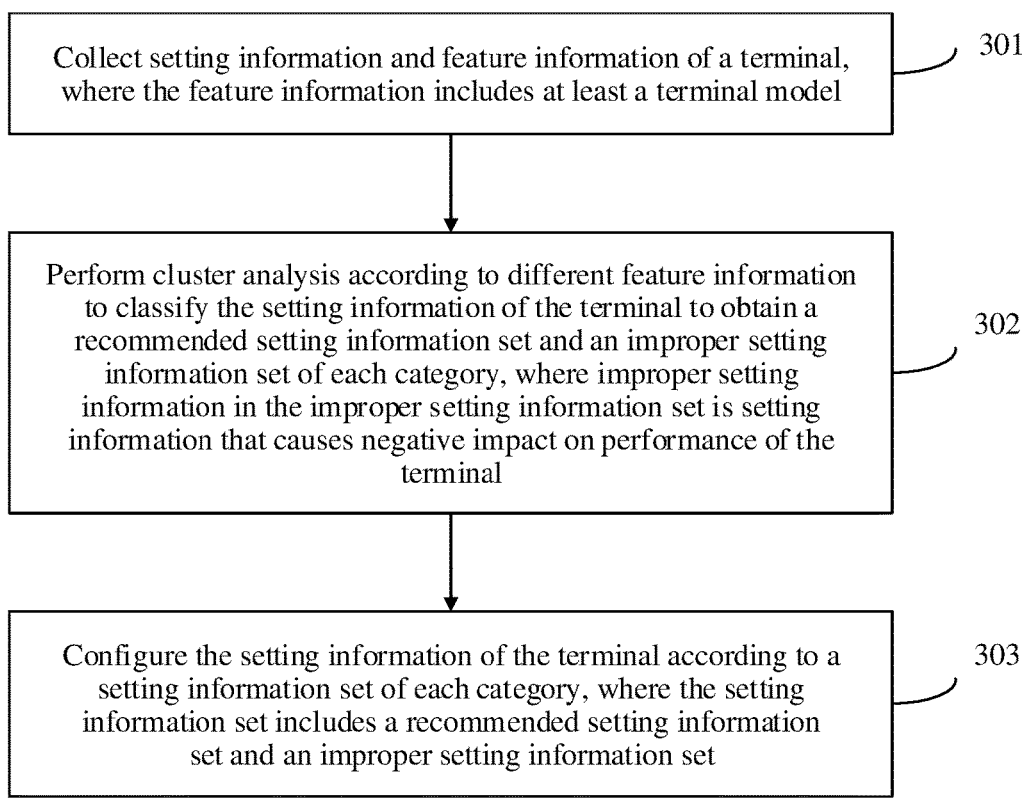
FIG. 3 is a flowchart of a setting information configuration method according to another embodiment of the present disclosure.

An embodiment of the present disclosure provides a setting information configuration method, and the method is used by a server. Referring to FIG. 3, a procedure of the method provided in this embodiment includes the following steps.

Step 301: Collect setting information and feature information of a terminal, where the feature information includes at least a terminal model.

It should be noted that setting information of a massive quantity of terminals is collected in this step for the purpose of obtaining a recommended setting information set and an improper setting information set subsequently according to the collected setting information of the massive quantity of terminals in order to provide a foundation for subsequent analysis on setting information of each terminal. This is not limited in this embodiment.

Step 302: Perform cluster analysis according to different feature information to classify the setting information of the terminal to obtain a recommended setting information set and an improper setting information set of each category, where improper setting information in the improper setting information set is setting information that causes negative impact on performance of the terminal.

The feature information is a feature for classifying the setting information, and terminals with similar features may be classified into one category according to the feature information. The feature information may include the terminal model, a start time and an end time that are corresponding to the setting information, a power consumption proportion of an application type, a quantity of battery charging and discharging times, and the like, and content of the feature information is not limited in this embodiment. The setting information is generally setting statuses of functions of the terminal within a period. Therefore, dates at two ends of a time range corresponding to the collected setting information may be used as the start time and the end time that are corresponding to the setting information.

In addition, during specific cluster analysis, each item of feature information of each terminal may be analyzed and compared, terminals with same or similar feature information are classified into one category, and setting information of terminals of a same category is also classified into one category. This is not limited in this embodiment.

For example, five terminals are used as an example, and feature information of the five terminals may be shown in the following Table 1.

TABLE 1

| Terminal model | Start time | End time | Power consumption proportion of an application type | Quantity of battery charging times |
|---|---|---|---|---|
| ux350 | Dec. 20, 2014 | Feb. 23, 2015 | Video 30% music 40% ... | 100 |
| ux350 | Dec. 20, 2014 | Feb. 22, 2015 | Video 31% music 42% ... | 101 |
| ux351 | Dec. 20, 2014 | Feb. 23, 2015 | Video 20% music 52% ... | 100 |
| ux351 | Dec. 20, 2014 | Feb. 23, 2015 | Video 21% music 50% ... | 103 |
| ux352 | Dec. 20, 2014 | Feb. 23, 2015 | Video 10% music 60% ... | 200 |

As shown in Table 1, in the feature information of the five terminals, terminal models in both the first entry and the second entry in Table 1 are ux350, there is totally only a one-day difference between start times and between end times corresponding to setting information, that is, the start times and the end times are relatively close, power consumption proportions of application types are relatively close, and quantities of battery charging times are also relatively close. Therefore, terminals corresponding to the first entry and the second entry may be used as terminals of a same category, and the setting information corresponding to the two terminals may be classified into one category. Likewise, terminals corresponding to the third entry and the fourth entry in Table 1 may be used as terminals of a same category, a terminal corresponding to the fifth entry is used as a terminal of one category, and setting information corresponding to terminals of a same category is classified into one category.

Step 303: Configure the setting information of the terminal according to a setting information set of each category, where the setting information set includes a recommended setting information set and an improper setting information set.

In the method provided in this embodiment of the present disclosure, setting information and feature information of a terminal are obtained, cluster analysis is performed according to different feature information to classify the setting information of the terminal to obtain a recommended setting information set and an improper setting information set of each category, and the setting information of the terminal is configured according to a setting information set of each category. Because local setting information can be purposefully configured according to the setting information set of each category, setting information configuration flexibility is relatively high.

In an optional embodiment, before configuring the setting information of the terminal according to a setting information set of each category, the method further includes collecting setting information of each category, and updating the corresponding recommended setting information set according to the collected setting information of each category.

Configuring the setting information of the terminal according to a setting information set of each category includes configuring the setting information of the terminal according to the improper setting information set of each category and the updated recommended setting information set.

In an optional embodiment, updating the corresponding recommended setting information set according to the collected setting information of each category includes sorting the collected setting information of each category and determining setting information that meets a preset counter condition, according to a preset counter, and updating each piece of corresponding recommended setting information in the recommended setting information set according to each piece of setting information that meets the preset counter condition.

In an optional embodiment, configuring the setting information of the terminal according to a setting information set of each category includes receiving local setting information uploaded by the terminal, determining a category corresponding to the local setting information, determining an improper setting information set of the category corresponding to the local setting information, matching the local setting information with the improper setting information set, setting the matching information as improper setting information of a user when matching information exists between the local setting information and the improper setting information set, querying, according to a correspondence between improper setting information and a setting suggestion, a setting suggestion corresponding to the improper setting information of the user, and returning the improper setting information of the user and the setting suggestion to the terminal such that the terminal configures the setting information according to the improper setting information and the setting suggestion.

In an optional embodiment, configuring the setting information of the terminal according to a setting information set of each category includes receiving local setting information uploaded by the terminal, determining a category corresponding to the local setting information, determining a recommended setting information set of the category corresponding to the local setting information, and sending the recommended setting information set to the terminal such that the terminal configures the setting information according to the recommended setting information set.

In an optional embodiment, configuring the setting information of the terminal according to a setting information set of each category includes receiving setting information uploaded by the terminal according to a preset period, determining a category corresponding to the setting information uploaded by the terminal, determining an improper setting information set of the category corresponding to the setting information uploaded by the terminal, and sending the improper setting information set to the terminal such that after storing the improper setting information, the terminal configures the setting information according to the stored improper setting information set.

An optional embodiment of the present disclosure may be formed by any combination of the foregoing optional technical solutions, and details are not described herein.

Figure 4A:
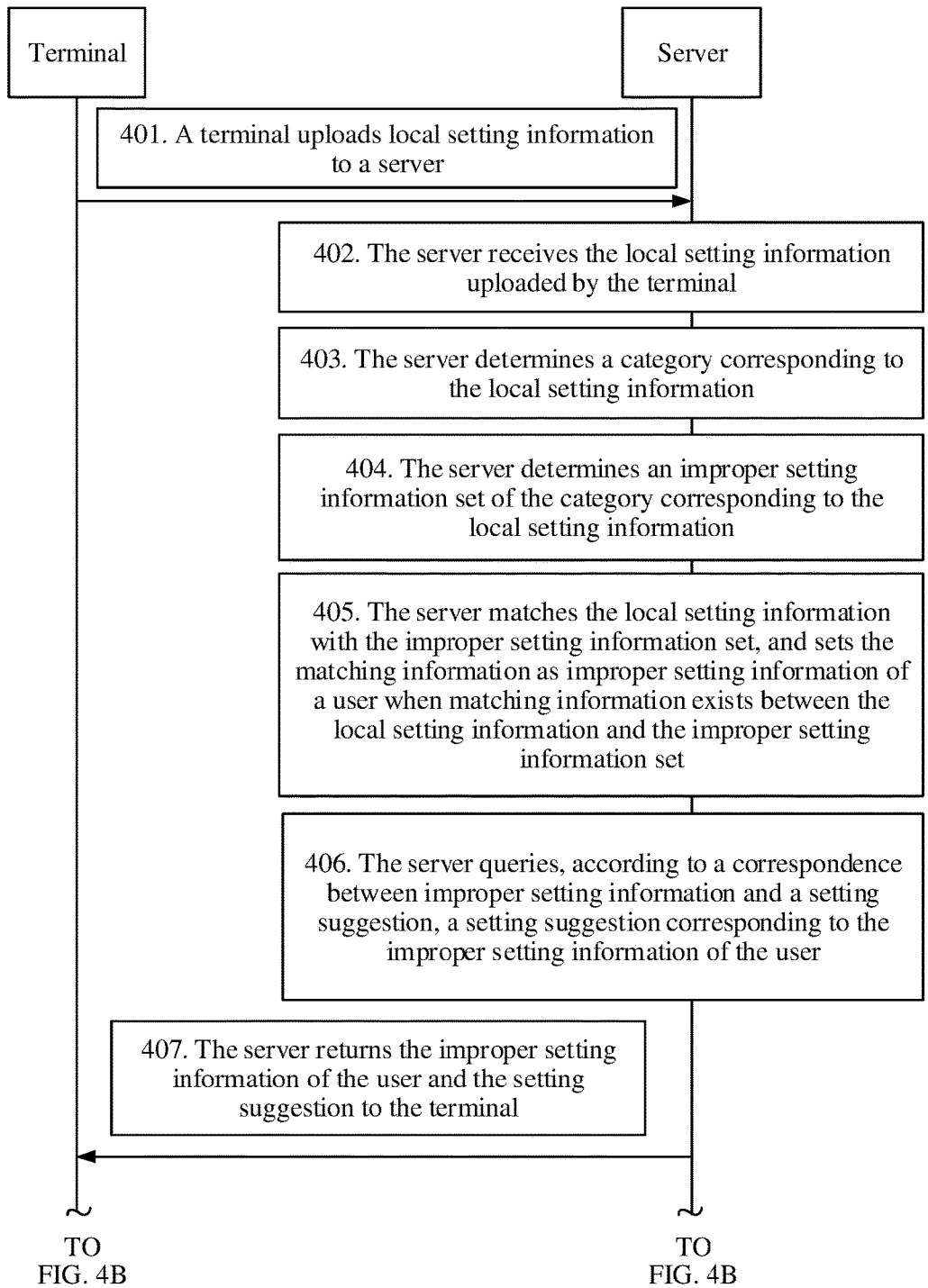

An embodiment of the present disclosure provides a setting information configuration method, and the method relates to a terminal and a server. With reference to content in the foregoing embodiment, the method provided in this embodiment is described with examples. Referring to FIG. 4A and FIG. 4B, a procedure of the method provided in this embodiment includes the following steps.

Step 401: The terminal uploads local setting information to the server.

With reference to content in the embodiment corresponding to FIG. 2, it may be learned that setting information is mainly used to describe setting statuses of functions of the terminal when a user uses the terminal. Correspondingly, the local setting information on a terminal side is current setting statuses of the functions of the terminal. For specific content of the local setting information, reference may be made to content in step 201 in the foregoing embodiment corresponding to FIG. 2, and details are not described herein again. It should be noted that when uploading the local setting information to the server, the terminal may upload the local setting information to the server in a text form, and a form of the local setting information is not limited in this embodiment.

In addition, in a subsequent step, the server needs to cluster the local setting information uploaded by the terminal, and the server needs to cluster, according to different feature information, the local setting information uploaded by the terminal. Therefore, to help the server to subsequently cluster the local setting information uploaded by the terminal, the terminal may further send local feature information to the server. For descriptions of the feature information, reference may be made to content in the foregoing embodiment corresponding to FIG. 3, and details are not described herein again.

Step 402: The server receives the local setting information uploaded by the terminal.

According to step 401, the terminal may further upload the feature information to the server when uploading the local setting information to the server. Therefore, in this step of 402, in addition to the local setting information uploaded by the terminal, the server may receive the feature information uploaded by the terminal, and this is not limited in this embodiment.

Step 403: The server determines a category corresponding to the local setting information.

The category is a terminal type that includes several items of feature information, and this is not limited in this embodiment. Each terminal corresponds to several items of feature information. Therefore, terminals that have same or similar feature information may be classified into one category and used as one terminal type, that is, one category. A terminal type of a terminal can be determined according to feature information of the terminal such that a category corresponding to local setting information of the terminal can be determined.

On the basis of content described above, different local setting information corresponds to different categories, and therefore, manners of configuring setting information of different categories are also different. The category corresponding to the local setting information may be first determined in this step in order to subsequently configure the setting information.

Before this step is performed, classification may be first performed to obtain a recommended setting information set and an improper setting information set of each category. A manner of performing classification to obtain the recommended setting information set and the improper setting information set of each category is not limited in this embodiment, and includes but is not limited to collecting the setting information and the feature information of the terminal, where the feature information includes at least a terminal model, and performing cluster analysis according to different feature information, to classify the setting information of the terminal to obtain the recommended setting information set and the improper setting information set of each category, where improper setting information in the improper setting information set is setting information that causes negative impact on performance of the terminal.

For a specific process of performing classification according to the feature information, reference may be made to content in step 302 in the foregoing embodiment corresponding to FIG. 3, and details are not described herein again.

It should be noted that the improper setting information set may include multiple pieces of improper setting information, and this is not limited in this embodiment. In an optional case, the improper setting information in the set may be classified. Improper setting information of a same category or a same attribute is classified into one category, and this is not limited in this embodiment. For example, a quantity of calls during which BLUETOOTH is enabled and a quantity of calls during which a wireless network is enabled are used as an example. Because improper setting information corresponding to the two quantities is improper setting information in a state of being on a call, the improper setting information corresponding to the two quantities may be classified into one category. In another optional case, the set may include specific improper setting information, and this is not limited in this embodiment. For example, the improper setting information set may include only improper setting information related to screen adjustment.

After the classification, setting information of the terminal in application scenarios may be classified into respective categories. The application scenarios may include a call scenario, a music scenario, and the like, and a type of the application scenario is not limited in this embodiment. For example, in the embodiment corresponding to FIG. 3, terminals corresponding to the first row and the second row in Table 1 in step 302 may be classified into a first category, and the category is "a terminal model is ux350, a start time is approximately Dec. 20, 2014, an end time is approximately Feb. 23, 2015, a power consumption proportion of a video application is approximately 30%, a power consumption proportion of a music application is approximately 40%, and a quantity of battery charging times is approximately 100." A terminal that has features corresponding to all the foregoing feature information belongs to the first category. Terminals corresponding to the third row and the fourth row may be classified into a second category, and the category is "a terminal model is ux351, a start time is approximately Dec. 20, 2014, an end time is approximately Feb. 23, 2015, a power consumption proportion of a video application is approximately 20%, a power consumption proportion of a music application is approximately 50%, and a quantity of battery charging times is approximately 100." A terminal that has features corresponding to the foregoing feature information belongs to the second category. A terminal corresponding to the fifth row may be classified into a third category, and the category is "a terminal model is ux352, a start time is approximately Dec. 20, 2014, an end time is approximately Feb. 23, 2015, a power consumption proportion of a video application is approximately 10%, a power consumption proportion of a music application is approximately 60%, and a quantity of battery charging times is approximately 200." A terminal that has features corresponding to the foregoing feature information belongs to the third category. Certainly, only three possible categories are listed in Table 1, and in actual implementation, more categories may be obtained by means of classification according to the feature information of the terminal. This is not limited in this embodiment. If feature information of a terminal and the feature information corresponding to the first category have same or similar features, setting information of the terminal may be classified into the first category. For example, if setting information of the terminal is that a screen luminance value is 50% and a quantity of calls within a period and during which WI-FI is enabled is 100, the setting information may be used as setting information of the first category.

With reference to content in step 201 in the embodiment corresponding to FIG. 2, it may be learned that setting information of different terminals may be corresponding to preset counter values of different values. For each category, preset counter values corresponding to different setting information in different application scenarios are different. Therefore, a preset counter value corresponding to setting information of each category in each application scenario may be sorted, and a setting information set with an optimal preset counter value may be selected as a recommended setting information set of the category in each application scenario. For example, the preset counter value is power consumption of the terminal. Power consumption corresponding to setting information of each category in each application scenario may be sorted, and a setting information set with minimum power consumption may be selected as a recommended setting information set of the category in each application scenario.

The first category in the foregoing Table 1 is used as an example, and a recommended setting information set of the first category in each application scenario may be shown in the following Table 2.

TABLE 2

| Application scenario | Detection item | Recommended setting information |
|---|---|---|
| Call | WI-FI idle connection status | Disabled |
| | Global Positioning System (GPS) idle connection status | Disabled |
| | BLUETOOTH idle connection status | Disabled |
| Video | Adjust a current screen luminance value according to ambient light | Adjust the screen luminance value to 40% |
| | Background application | Close a background application such as an instant messaging application |
| | GPS idle connection status | Disabled |
| | BLUETOOTH idle connection status | Disabled |
| Music | Adjust a current screen luminance value according to ambient light | Adjust the screen luminance value to 30% |
| | Background application | Close a background application such as a video application |
| | WI-FI idle connection status | Disabled |
| | GPS idle connection status | Disabled |
| | BLUETOOTH idle connection status | Disabled |
| Standby | Setting of a screen-on time without an operation | Five minutes |
| | Quantity of background applications | Close a background application |
| | WI-FI idle connection status | Disabled |
| | GPS idle connection status | Disabled |
| | BLUETOOTH idle connection status | Disabled |
| Game | Adjust a current screen luminance value according to ambient light | Adjust the screen luminance value to 40% |
| | Background application | Close another background application |
| ... | | ... |

In the foregoing Table 2, in a call scenario, setting information in a recommended setting information set is disabling WI-FI, disabling a GPS connection, and disabling BLUETOOTH. In a video scenario, setting information in a recommended setting information set is adjusting a screen luminance value to 30%, closing a background application such as an instant messaging application, disabling a GPS connection, and disabling a BLUETOOTH connection. Certainly, there may be another application scenario and a corresponding recommended setting information set, and a type of an application scenario and a corresponding recommended setting information set are not limited in this embodiment.

In addition, the preset counter value corresponding to the setting information in each application scenario may be sorted, and setting information with a poorest preset counter value may be selected as an improper setting information set of the category in each application scenario. The first category in the foregoing Table 1 is used as an example, and an improper setting information set of the first category in each application scenario may be shown in the following Table 3.

TABLE 3

| Application scenario | Detection item | Match status | Match condition (quantity of matching times/ quantity of events) |
|---|---|---|---|
| Call | WI-FI idle connection status | Enabled | >n % |
| | GPS idle connection status | Enabled | >n % |
| | BLUETOOTH idle connection status | Enabled | >n % |
| Video | Current screen luminance | Identify that current ambient light is unsuitable for the current luminance | >n % |
| | Quantity of background applications | Above m | >n % |
| | WI-FI idle connection status | Enabled | >n % |
| | GPS idle connection status | Enabled | >n % |
| | BLUETOOTH idle connection status | Enabled | >n % |
| Music | Current screen luminance | Identify that current ambient light is unsuitable for the current luminance | >n % |
| | Quantity of background applications | Above m | >n % |
| | WI-FI idle connection status | Enabled | >n % |
| | GPS idle connection status | Enabled | >n % |
| | BLUETOOTH idle connection status | Enabled | >n % |
| Standby | Screen-on time without an operation | Above i minutes | >n % |
| | Quantity of background applications | Above m | >n % |
| | WI-FI idle connection status | Enabled | >n % |
| | GPS idle connection status | Enabled | >n % |
| | BLUETOOTH idle connection status | Enabled | >n % |
| Battery charging | Power of a mobile phone during charging | >h % | >n % |
| | Power charged each time | <j % | >n % |
| | Charging duration | >k % | >n % |
| Game | Current screen luminance | Identify that current ambient light is unsuitable for the current luminance | >n % |
| | Quantity of background applications | Above m | >n % |
| ... | ... | ... | ... |

In the foregoing Table 3, in a call scenario, improper setting information in an improper setting information set is that a proportion of a quantity of calls during which WI-FI is enabled in a total quantity of calls is greater than n %, a proportion of a quantity of calls during which GPS is enabled in the total quantity of calls is greater than n %, and a proportion of a quantity of calls during which BLUETOOTH is enabled in the total quantity of calls is greater than n %. Certainly, in addition to application scenarios in the foregoing Table 3 and improper setting information sets in the application scenarios, another application scenario and a corresponding an improper setting information set may exist, and a type of an application scenario and a corresponding improper setting information set are not limited in this embodiment.

Subsequently, the setting information of the terminal needs to be configured according to a setting information set of each category. Therefore, to configure the setting information to better accord with a use habit of the user, this embodiment further provides a method for updating a recommended setting information set. A specific process includes collecting setting information of each category, and updating the corresponding recommended setting information set according to the collected setting information of each category.

When the corresponding recommended setting information set is being updated according to the collected setting information of each category, a preset counter value corresponding to setting information that is newly classified into each category may be calculated. If the calculated preset counter value is better than a preset counter value corresponding to the recommended setting information set, the recommended setting information set may be updated.

For example, a category is the first category in the foregoing Table 1 and a preset counter is power consumption. In the video scenario, the recommended setting information in the recommended setting information set is adjusting the screen luminance value to 40%, closing the background application such as the instant messaging application, and disabling GPS and BLUETOOTH. If setting information that is newly classified into the first category is adjusting the screen luminance value to 30%, and corresponding power consumption is less than power consumption corresponding to the recommended setting information set, the recommended description information in the recommended setting information set may be updated from "adjust the screen luminance value to 40%" to "adjust the screen luminance value to 30%."

After the setting information collected from the terminal is clustered to obtain the recommended setting information set and the improper setting information set of each category, the category corresponding to the local setting information can be determined because the collected setting information is clustered. A manner used by the server to determine the category corresponding to the local setting information is not limited in this embodiment, and includes but is not limited to determining, according to the feature information uploaded by the terminal, the category corresponding to the local setting information.

For example, the feature information uploaded by the terminal is that a terminal model is ux350, a start time is Dec. 20, 2014, an end time is Feb. 23, 2015, power consumption proportions of application types are 30% for a video application and 40% for a music application, and a quantity of battery charging times is 100. With reference to the foregoing example, because the feature information of the terminal and the feature information corresponding to the first category in the foregoing Table 1 have same or similar features, the terminal may be classified into the first category.

Step 404: The server determines an improper setting information set of the category corresponding to the local setting information.

A manner used by the server to determine the improper setting information set of the category corresponding to the local setting information is not limited in this embodiment, and includes but is not limited to determining, according to a correspondence between a category and an improper setting information set, the improper setting information set of the category corresponding to the local setting information.

For example, in the foregoing step 403, if the category corresponding to the local setting information is the first category in the foregoing Table 1, an improper setting information set corresponding to the first category, that is, content in the foregoing Table 3, is used as the improper setting information set of the category corresponding to the local setting information.

Step 405: The server matches the local setting information with the improper setting information set, and sets the matching information as improper setting information of a user when matching information exists between the local setting information and the improper setting information set.

In the foregoing step 403, improper setting information in the improper setting information set generally includes a threshold. For example, in the call scenario, one piece of improper setting information in the improper setting information set is that the proportion of the quantity of calls during which WI-FI is enabled in the total quantity of calls is greater than n %. Therefore, when matching is being performed between the local setting information and the improper setting information set, local setting information and improper setting information in an improper setting information set in a same application scenario may be compared. When one piece of setting information in the local setting information is greater than a threshold included in one piece of improper setting information, it is determined that matching information exists between the local setting information and the improper setting information set.

For example, a call scenario is used as an example. Content of an improper setting information set in the call scenario may be shown in the following Table 4.

TABLE 4

| Application scenario | Detection item | Match status | Match condition (quantity of matching times/quantity of events) |
|---|---|---|---|
| Call | WI-FI idle connection status | Enabled | >30% |
|  | GPS idle connection status | Enabled | >50% |
|  | BLUETOOTH idle connection status | Enabled | >60% |

For example, in the call scenario, in the local setting information, a total quantity of calls is 100, a quantity of calls during which WI-FI is enabled is 40, a quantity of calls during which GPS is enabled is 30, and a quantity of calls during which BLUETOOTH is enabled is 50. The total quantity of calls is a quantity of events. The quantity of calls during which WI-FI is enabled is a quantity of matching times when WI-FI is in an enabled state. The quantity of calls during which GPS is enabled is a quantity of matching times when GPS is in an enabled state. The quantity of calls during which BLUETOOTH is enabled is a quantity of matching times when BLUETOOTH is in an enabled state.

According to the foregoing data, it may be determined that in the call scenario, a proportion of the quantity of matching times when WI-FI is in an enabled state in the quantity of events is 40%, a proportion of the quantity of matching times when GPS is in an enabled state in the quantity of events is 30%, and a proportion of the quantity of matching times when BLUETOOTH is in an enabled state in the quantity of events is 50%. Because the proportion of the quantity of matching times when WI-FI is in an enabled state in the quantity of events, 40%, is greater than a threshold in improper setting information, 30%, it may be determined that matching information exists between the local setting information and the improper setting information set. The matching information may be that a quantity of calls that are made by the user and during which WI-FI is enabled is relatively large. After the matching information is determined, the matching information may be used as improper setting information of the user.

Step 406: The server queries, according to a correspondence between improper setting information and a setting suggestion, a setting suggestion corresponding to the improper setting information of the user.

Improper setting information and a setting suggestion may be stored correspondingly on a server side in advance such that the corresponding setting suggestion is queried according to the improper setting information of the user after the improper setting information of the user is determined in the foregoing step 405. The setting suggestion corresponding to the improper setting information may be predetermined manually and stored correspondingly together with the improper setting information at a big data platform of the server side. For example, setting suggestions in different cases in the call scenario may be shown in the following Table 5.

TABLE 5

| Application scenario | Detection item | Match status | Match condition (quantity of matching times/quantity of events) | Setting suggestion |
|---|---|---|---|---|
| Call | WI-FI idle connection status | Enabled | >30% | Reduce a quantity of calls during which WI-FI is enabled |
|  | GPS idle connection status | Enabled | >50% | Reduce a quantity of calls during which GPS is enabled |
|  | BLUETOOTH idle connection status | Enabled | >60% | Reduce a quantity of calls during which BLUETOOTH is enabled |

When the improper setting information is that "a quantity of calls during which WI-FI is enabled is relatively large," it may be learned by means of query according to Table 5 that a corresponding setting suggestion is "reduce a quantity of calls during which WI-FI is enabled."

It should be noted that the big data platform of the server side may store a template related to a setting suggestion such that a constructive suggestion that is opposite to improper setting information can be filled into a corresponding template according to content of the improper setting information. This is not limited in this embodiment.

Step 407: The server returns the improper setting information of the user and the setting suggestion to the terminal.

Step 408: The terminal obtains an analysis result, where the analysis result includes at least the improper setting information of the user and the setting suggestion.

Step 409: The terminal displays the improper setting information of the user and the setting suggestion.

A manner used by the terminal to display the improper setting information and the setting suggestion is not limited in this embodiment, and includes but is not limited to displaying a reminder interface used to remind the user that there is an improper setting habit, and displaying the improper setting information of the user and the setting suggestion when a display instruction entered by the user on the reminder interface is detected.

Figure 5:
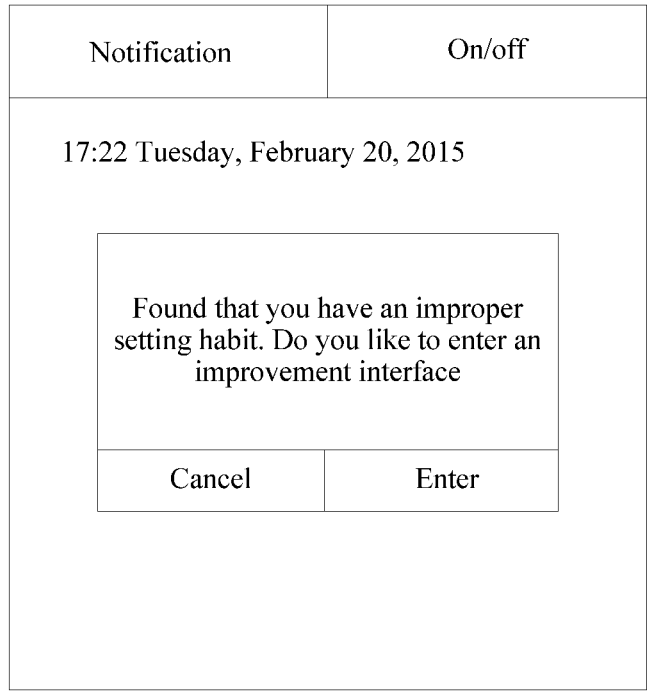
FIG. 5 is a schematic diagram of a reminder interface according to another embodiment of the present disclosure.
Figure 6:
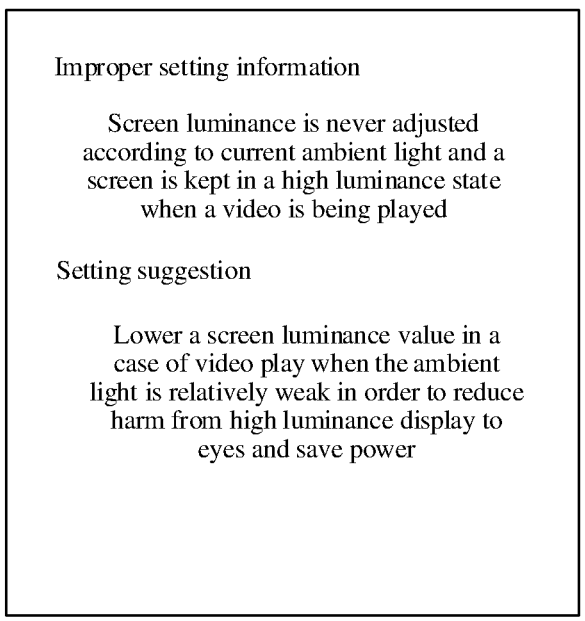
FIG. 6 is a schematic diagram of information display according to another embodiment of the present disclosure.

For example, the improper setting information of the user is that in a video playing scenario, a screen luminance value is not adjusted according to current ambient light and a screen is kept in a high luminance state when a video is being played. Correspondingly, the setting suggestion may be lowering the screen luminance value in a case of video play when the ambient light is relatively weak in order to protect eyesight and save power. The displayed reminder interface used to remind the user that there is an improper setting habit may be shown in FIG. 5, and the improper setting information of the user and the setting suggestion that are displayed when the display instruction entered by the user on the reminder interface is detected may be shown in FIG. 6.

In addition, to make a display process more user-friendly, the terminal may first display the reminder interface used to remind the user that there is an improper setting habit, when the display instruction entered by the user on the reminder interface is detected, display the improper setting information of the user and display a reminder of whether to display the setting suggestion, and then, when an instruction that is entered by the user and that is for displaying the setting suggestion is detected, display the setting suggestion. This is not limited in this embodiment.

Step 410: The terminal receives a setting instruction entered by the user according to the displayed improper setting information and setting suggestion.

According to the foregoing step 409, after the terminal displays the improper setting information of the user and the setting suggestion, the use may manually enter the setting instruction according to the improper setting information and the setting suggestion such that the terminal can receive the setting instruction entered by the user. For example, the improper setting information and the setting suggestion in the foregoing step 409 are used as an example. The user may enter a screen luminance setting instruction according to the displayed improper setting information and setting suggestion in order to lower the screen luminance value when a video is being played.

Step 411: The terminal configures the local setting information according to the setting instruction.

When the terminal configures the local setting information according to the setting instruction, content of the configuration may include setting a screen luminance value, closing a background application, disabling WI-FI, and the like. This is not limited in this embodiment.

It should be noted that the foregoing steps 410 and 411 are mainly a process in which the user manually enters the setting instruction according to the displayed improper setting information and setting suggestion in order to configure the local setting information. For ease of configuring the local setting information, this embodiment further provides a method for configuring the local setting information according to the recommended setting information set in the foregoing step 403. A specific process is as follows. A server receives local setting information uploaded by a terminal. The server determines a category corresponding to the local setting information. The server determines a recommended setting information set of the category corresponding to the local setting information. The server sends the recommended setting information set to the terminal. The terminal obtains the recommended setting information set of the local setting information. The terminal displays a reminder of whether to accept the recommended setting information set, and the terminal configures the local setting information according to the recommended setting information set when an instruction of a user for accepting the recommended setting information set is detected and it is identified that a current scenario is a preset scenario.

Figure 7:
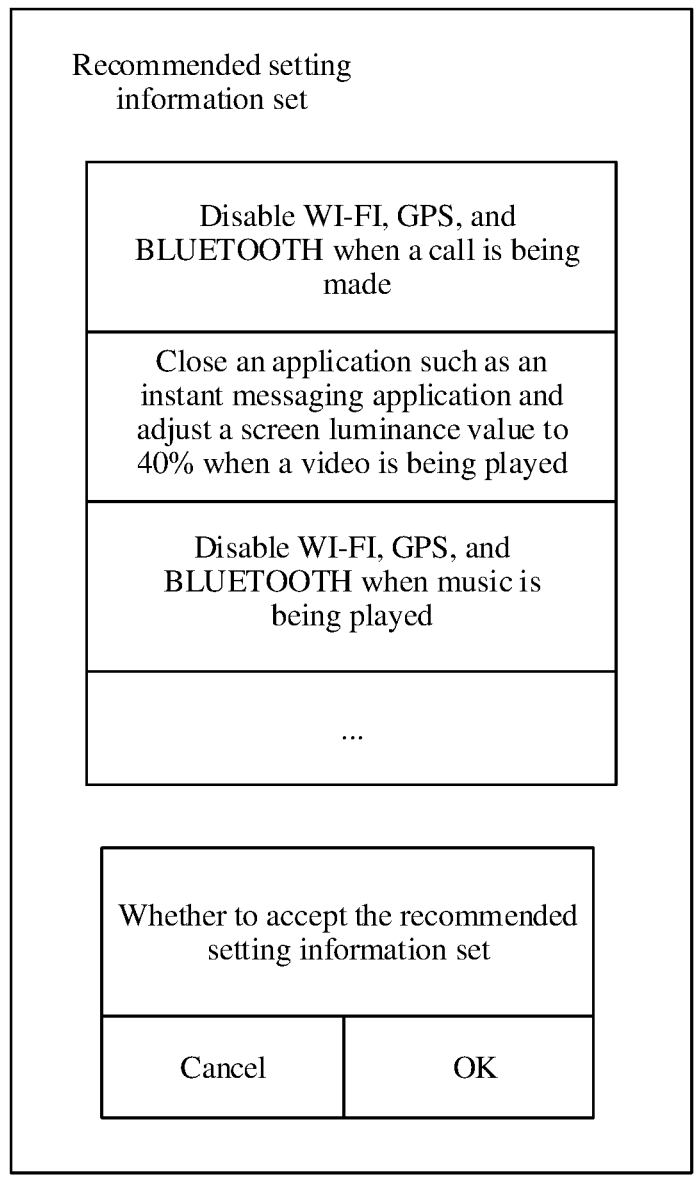
FIG. 7 is a schematic diagram of a reminder interface according to another embodiment of the present disclosure.

For example, the category corresponding to the local setting information and determined by the server is the first category in the foregoing Table 1. For the category, a corresponding recommended setting information set determined by the server is shown in Table 2. After obtaining the recommended setting information set sent by the server, the terminal may display a reminder of whether to accept the recommended setting information set. The reminder interface may be shown in FIG. 7.

When an instruction of the user for accepting the recommended setting information set is detected and it is identified that a current scenario is an application scenario in Table 2, the terminal may configure the local setting information according to the recommended setting information set in the application scenario. For example, an application scenario is a call scenario. When it is identified that a current scenario is a call scenario, a WI-FI, GPS, and BLUETOOTH connection may be disabled according to a recommended setting information set in the call scenario.

In addition, a scenario identification engine may be used to identify the current scenario. Application scenarios such as a call scenario, a video scenario, a music scenario, a standby scenario, and a game scenario can be identified using the scenario identification engine. For example, when the user watches a video, the scenario identification engine can detect whether a system component for video play is currently used. When it is detected that the component is used and the user is using an application program that can be used to play a video, it is determined that the current scenario is a video scenario.

In the foregoing step 403, a process in which a recommended setting information set is updated is involved. Correspondingly, in this step, when configuring the local setting information according to the recommended setting information set, the terminal may configure the local setting information according to the updated recommended setting information set. This is not limited in this embodiment.

It should be noted that when the server sends the recommended setting information set to the terminal, a sending frequency of the recommended setting information set is relatively high, and consequently, the terminal frequently reminds the user. Therefore, the user becomes bored, and user experience is deteriorated. To avoid this case, the server may set a monitoring period before sending the recommended setting information set to the terminal, and sends the recommended setting information set to the terminal when it is detected within a monitoring period that a quantity of times of matching between the local setting information uploaded by the terminal and the improper setting information set is greater than a specific threshold. This is not limited in this embodiment. A negative effect brought by frequent sending of the recommended setting information set to the user in a short period of time can be avoided using the foregoing process.

In the method provided in this embodiment of the present disclosure, a server obtains local setting information uploaded by a terminal, determines an improper setting information set of a category corresponding to the local setting information, matches the local setting information with the improper setting information set to obtain improper setting information and a setting suggestion, and returns the improper setting information of a user and the setting suggestion to the terminal. The terminal displays the received improper setting information and setting suggestion, receives a corresponding setting instruction, and configures the local setting information. Because the server can analyze the local setting information, and the terminal can display the improper setting information and the setting suggestion that are obtained by means of analysis, the user can purposefully configure the local setting information. Therefore, setting information configuration flexibility is relatively high.

Figure 8A:
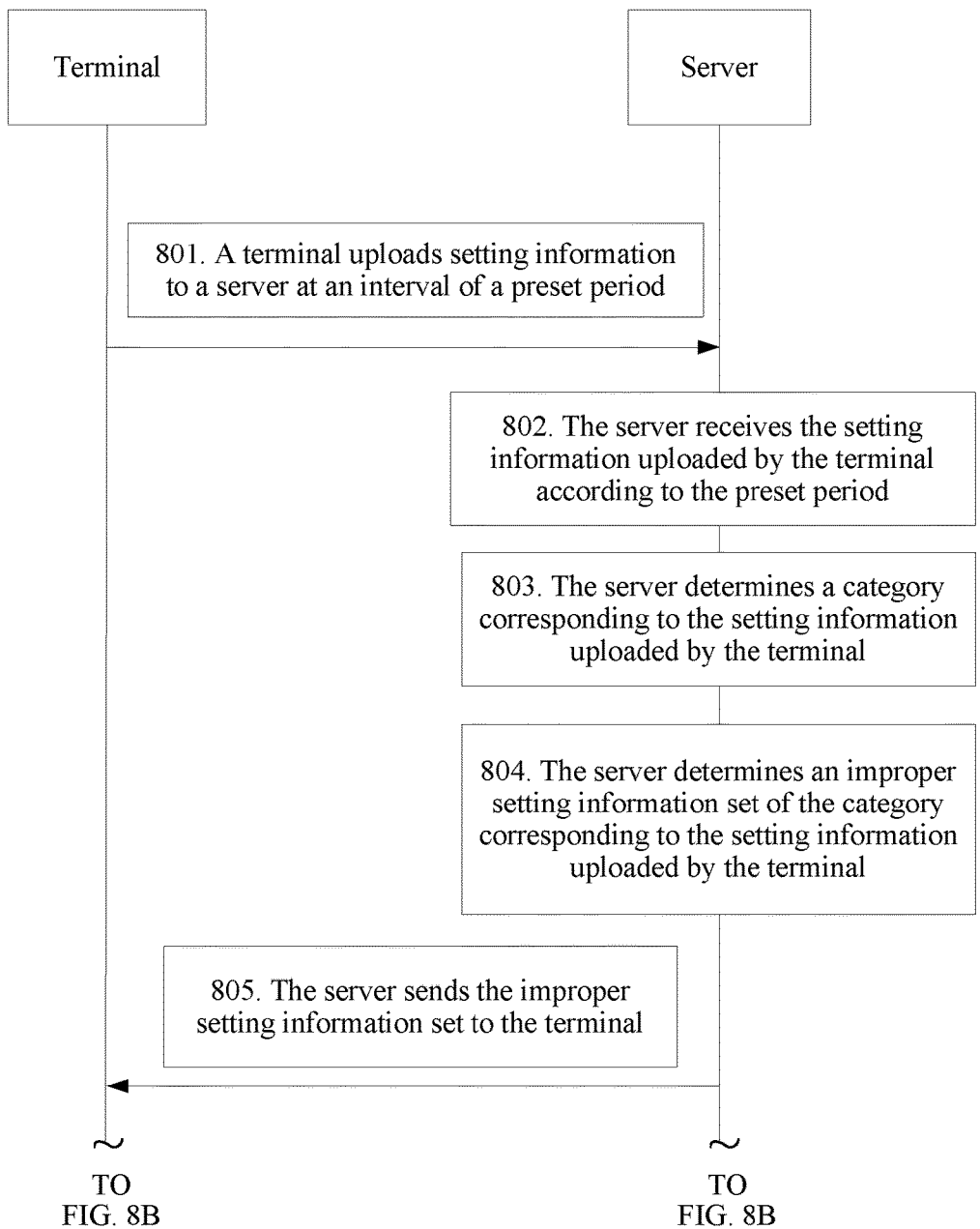
FIG. 8A and FIG. 8B are a flowchart of a setting information configuration method according to another embodiment of the present disclosure.
Figure 8B:
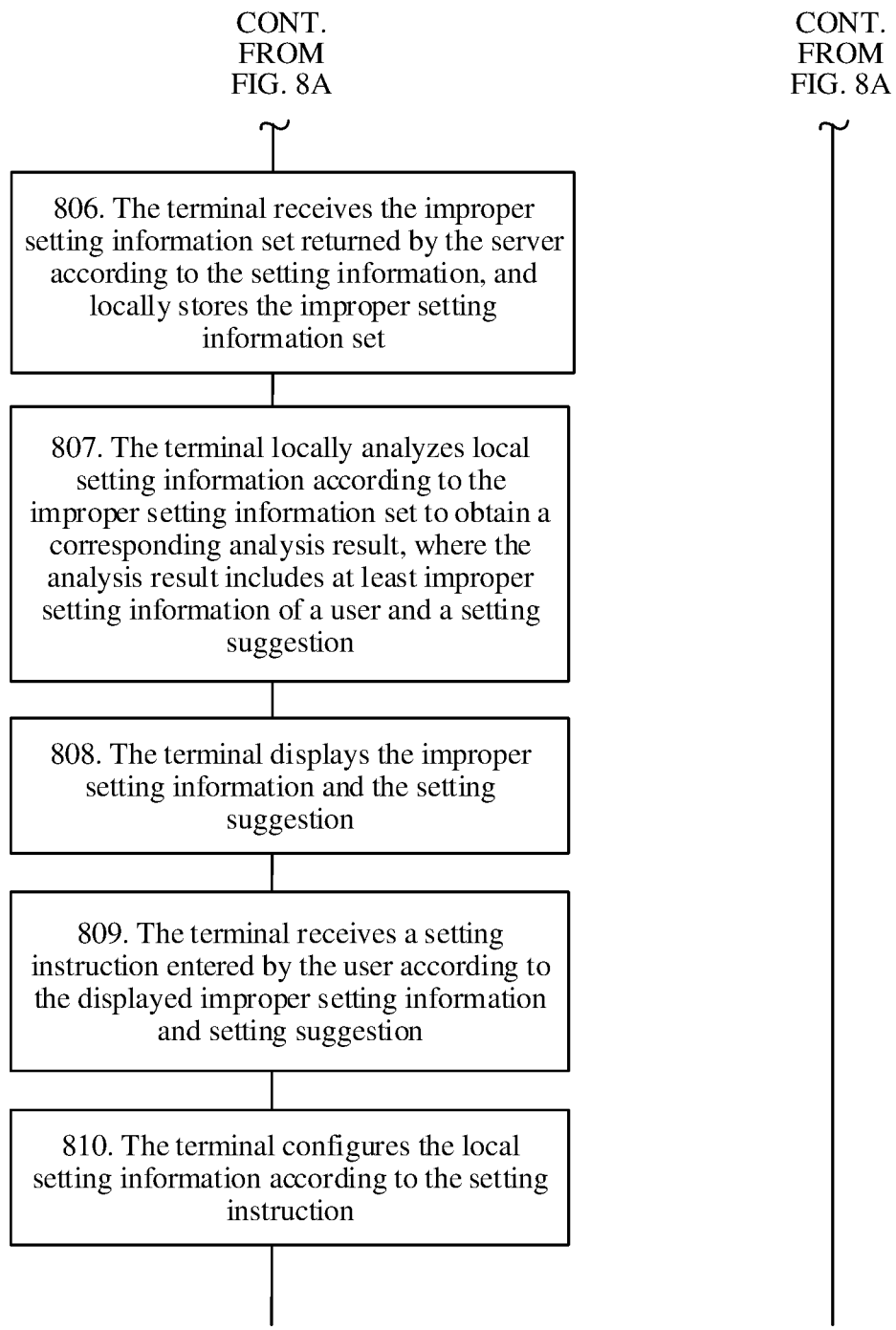

Analysis processes such as cluster analysis in the embodiment corresponding to FIG. 4A are mainly executed by a server. However, in an actual implementation process, the analysis processes may be executed locally by a terminal. This is not limited in this embodiment. For this case, an embodiment of the present disclosure provides a setting information configuration method, and the method relates to a terminal and a server. With reference to content in the foregoing embodiment, the method provided in this embodiment is described with examples. Referring to FIG. 8A and FIG. 8B, a procedure of the method provided in this embodiment includes the following steps.

Step 801: The terminal uploads setting information to the server at an interval of a preset period.

A length of the period for uploading the setting information to the server by the terminal may be set according to a requirement and may be changed in real time, and this is not limited in this embodiment. For a process in which the terminal uploads the setting information to the server, reference may be made to a process in step 401 in the embodiment corresponding to FIG. 4A, and details are not described herein again.

Step 802: The server receives the setting information uploaded by the terminal according to the preset period.

A manner used by the server to receive the setting information uploaded by the terminal according to the preset period is not limited in this embodiment. For a specific process, reference may be made to content in step 402 in the embodiment corresponding to FIG. 4A, and details are not described herein again.

Step 803: The server determines a category corresponding to the setting information uploaded by the terminal.

A manner used by the server to determine the category corresponding to the setting information uploaded by the terminal is not limited in this embodiment. For a specific process, reference may be made to content in step 403 in the embodiment corresponding to FIG. 4A, and details are not described herein again.

Step 804: The server determines an improper setting information set of the category corresponding to the setting information uploaded by the terminal.

A manner used by the server to determine the improper setting information set of the category corresponding to the setting information uploaded by the terminal is not limited in this embodiment. For a specific process, reference may be made to content in step 404 in the embodiment corresponding to FIG. 4A, and details are not described herein again.

Step 805: The server sends the improper setting information set to the terminal.

Step 806: The terminal receives the improper setting information set returned by the server according to the setting information, and locally stores the improper setting information set.

Step 807: The terminal locally analyzes local setting information according to the improper setting information set to obtain a corresponding analysis result, where the analysis result includes at least improper setting information of a user and a setting suggestion.

A manner used by the terminal to locally analyze the local setting information according to the improper setting information set, to obtain the corresponding analysis result is not limited in this embodiment, and includes but is not limited to matching the local setting information with the locally stored improper setting information set, where the improper setting information set includes at least one piece of improper setting information, setting the matching information as improper setting information of the user when matching information exists between the local setting information and the improper setting information set, and querying, according to a correspondence between improper setting information and a setting suggestion, a setting suggestion corresponding to the improper setting information of the user.

In specific implementation of the foregoing process, reference may be made to content in step 405 and step 406 in the embodiment corresponding to FIG. 4A, and details are not described herein again.

It should be noted that the foregoing steps 801 to 806 are mainly a process in which the terminal obtains the improper setting information set. In actual execution of step 807, if the improper setting information set has been locally stored, processes in steps 801 to 806 do not need to be executed. In addition, a template related to a setting suggestion may be stored on a terminal side such that a constructive suggestion that is opposite to improper setting information can be filled into a corresponding template according to content of the improper setting information. This is not limited in this embodiment. The template may be downloaded by the terminal from the server and stored on the terminal side, and this is not limited in this embodiment, either.

Step 808: The terminal displays the improper setting information and the setting suggestion.

A manner used by the terminal to display the improper setting information and the setting suggestion is not limited in this embodiment. For a specific process, reference may be made to content in step 409 in the embodiment corresponding to FIG. 4B, and details are not described herein again.

Step 809: The terminal receives a setting instruction entered by the user according to the displayed improper setting information and setting suggestion.

A manner used by the terminal to receive the setting instruction entered by the user according to the displayed improper setting information and setting suggestion is not limited in this embodiment. For a specific process, reference may be made to content in step 410 in the embodiment corresponding to FIG. 4B, and details are not described herein again.

Step 810: The terminal configures the local setting information according to the setting instruction.

A manner used by the terminal to configure the local setting information according to the setting instruction is not limited in this embodiment. For a specific process, reference may be made to content in step 411 in the embodiment corresponding to FIG. 4B, and details are not described herein again.

In the method provided in this embodiment of the present disclosure, a server obtains local setting information uploaded by a terminal, determines an improper setting information set of a category corresponding to the local setting information, and sends the improper setting information set to the terminal. The terminal receives the improper setting information returned by the server, locally analyzes the local setting information according to the improper setting information set, displays an analysis result, receives a setting instruction corresponding to the analysis result, and configures the local setting information. Because the terminal can analyze the local setting information and display improper setting information and a setting suggestion that are obtained by means of analysis, the user can purposefully configure the local setting information. Therefore, setting information configuration flexibility is relatively high.

Figure 9:
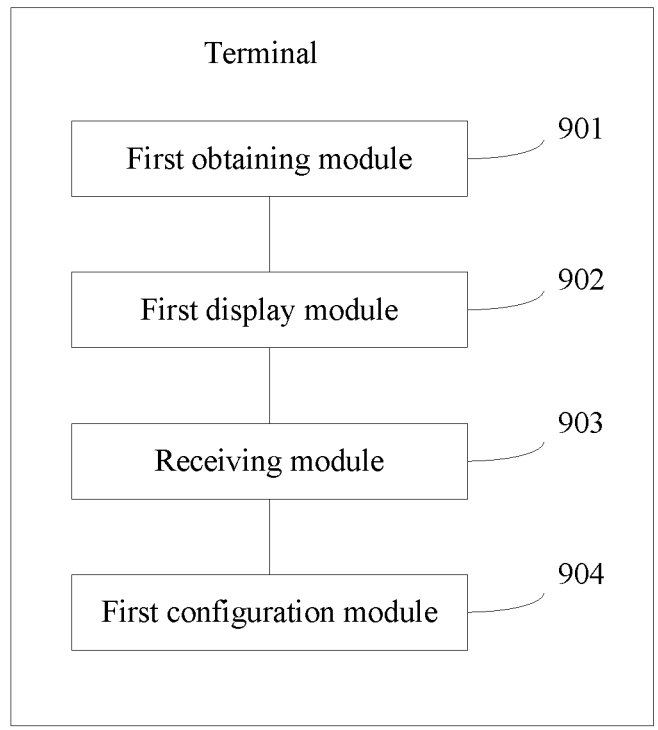
FIG. 9 is a schematic structural diagram of a terminal according to another embodiment of the present disclosure.

An embodiment of the present disclosure provides a terminal, and the terminal is used to execute functions executed by a terminal in the foregoing embodiment corresponding to FIG. 2 or FIG. 4A and FIG. 4B. Referring to FIG. 9, the terminal includes a first obtaining module 901 configured to obtain an analysis result, where the analysis result is obtained after local setting information is analyzed according to an improper setting information set, the analysis result includes at least improper setting information of a user and a setting suggestion, and the improper setting information is setting information that causes negative impact on performance of the terminal, a first display module 902 configured to display the improper setting information of the user and the setting suggestion, a receiving module 903 configured to receive a setting instruction entered by the user according to the displayed improper setting information and setting suggestion, and a first configuration module 904 configured to configure the local setting information according to the setting instruction.

Figure 10:
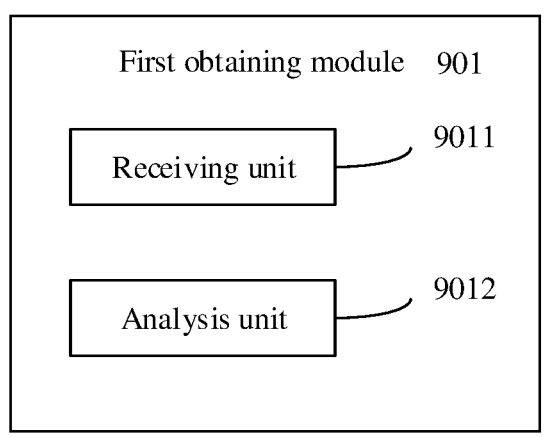
FIG. 10 is a schematic structural diagram of a first obtaining module according to another embodiment of the present disclosure.

In an optional embodiment, referring to FIG. 10, the first obtaining module 901 includes a receiving unit 9011 configured to upload the local setting information to a server and receive an analysis result returned by the server, where the analysis result is obtained after the server analyzes the local setting information according to the improper setting information set, or an analysis unit 9012 configured to locally analyze the local setting information according to the improper setting information set to obtain a corresponding analysis result.

Figure 11:
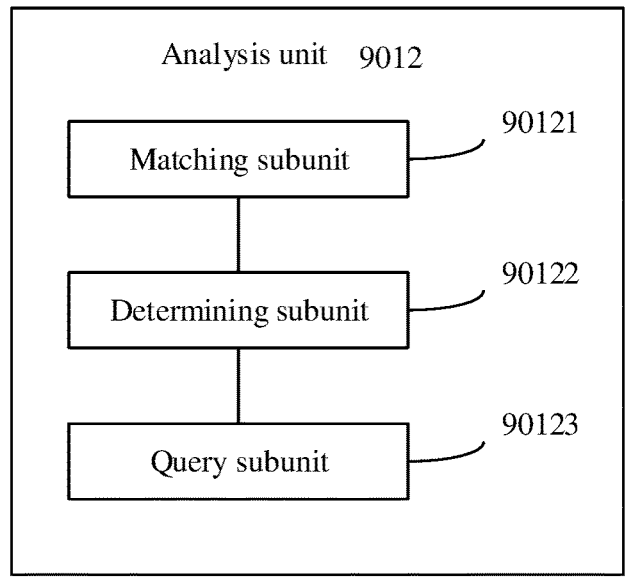
FIG. 11 is a schematic structural diagram of an analysis unit according to another embodiment of the present disclosure.

In an optional embodiment, referring to FIG. 11, the analysis unit 9012 includes a matching subunit 90121 configured to match the local setting information with a locally stored improper setting information set, where the improper setting information set includes at least one piece of improper setting information, a determining subunit 90122 configured to set the matching information as improper setting information of the user when matching information exists between the local setting information and the improper setting information set, and a query subunit 90123 configured to query, according to a correspondence between improper setting information and a setting suggestion, a setting suggestion corresponding to the improper setting information of the user.

Figure 12:
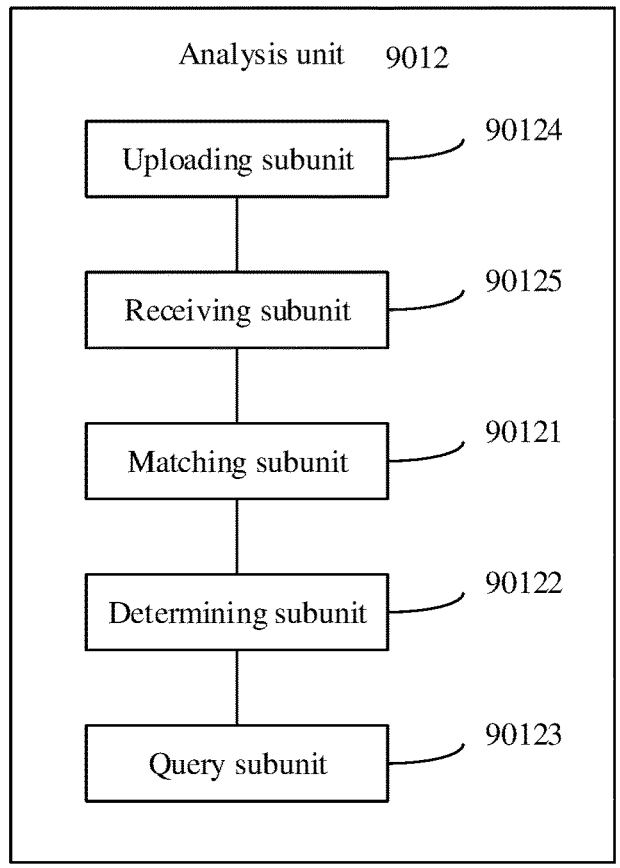
FIG. 12 is a schematic structural diagram of an analysis unit according to another embodiment of the present disclosure.

In an optional embodiment, referring to FIG. 12, the analysis unit 9012 further includes an uploading subunit 90124 configured to upload setting information to the server at an interval of a preset period such that the server returns a corresponding improper setting information set according to the received setting information, and a receiving subunit 90125 configured to receive the improper setting information set returned by the server according to the setting information and locally store the improper setting information set.

In an optional embodiment, when the improper setting information is that a screen luminance value is greater than a first preset threshold, the setting suggestion is lowering the screen luminance value.

In an optional embodiment, when the improper setting information is that a quantity of calls during which BLUETOOTH is enabled is greater than a second preset threshold, the setting suggestion is reducing the quantity of calls during which BLUETOOTH is enabled.

Figure 13:
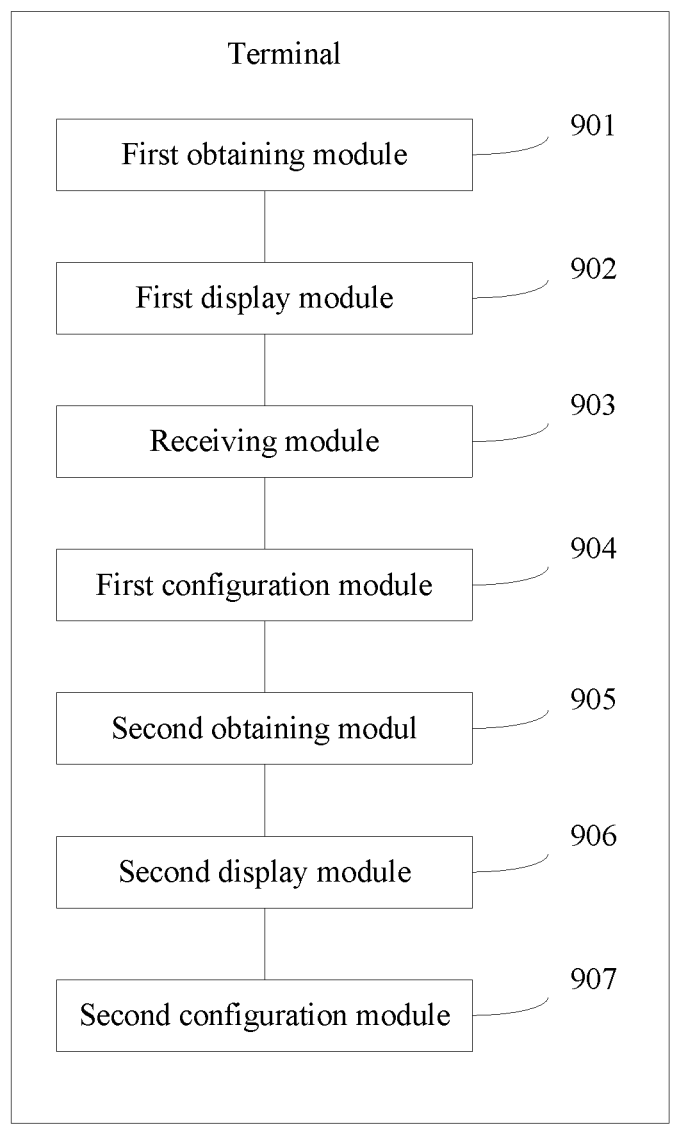
FIG. 13 is a schematic structural diagram of a terminal according to another embodiment of the present disclosure.

In an optional embodiment, based on terminal shown in FIG. 9 and referring to FIG. 13, the terminal further includes a second obtaining module 905 configured to obtain a recommended setting information set of the local setting information according to the local setting information, where the recommended setting information set includes at least one piece of recommended setting information, a second display module 906 configured to display a reminder of whether to accept the recommended setting information set, and a second configuration module 907 configured to configure the local setting information according to the recommended setting information set when an instruction of the user for accepting the recommended setting information set is detected and it is identified that a current scenario is a preset scenario.

According to the terminal provided in this embodiment of the present disclosure, an analysis result obtained after local setting information is analyzed is obtained, improper setting information and a setting suggestion that are in the analysis result are displayed, a setting instruction entered by a user according to the displayed improper setting information and setting suggestion is received, and the local setting information is configured according to the setting instruction. Because the local setting information can be analyzed and the improper setting information and the setting suggestion that are obtained by means of analysis can be displayed, the user can purposefully configure the local setting information. Therefore, setting information configuration flexibility is relatively high.

Figure 14:
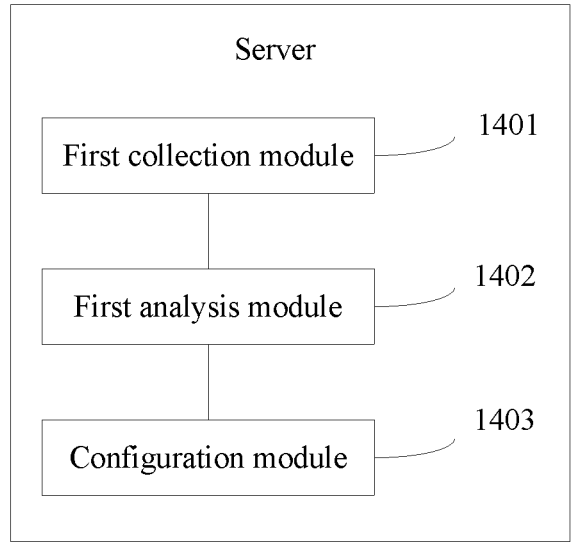
FIG. 14 is a schematic structural diagram of a server according to another embodiment of the present disclosure.

An embodiment of the present disclosure provides a server, and the server is used to execute functions executed by a server in the foregoing embodiment corresponding to FIG. 3 or FIG. 4A and FIG. 4B. Referring to FIG. 14, the server includes a first collection module 1401 configured to collect setting information and feature information of a terminal, where the feature information includes at least a terminal model, a first analysis module 1402 configured to perform cluster analysis according to different feature information to classify the setting information of the terminal to obtain a recommended setting information set and an improper setting information set of each category, where improper setting information in the improper setting information set is setting information that causes negative impact on performance of the terminal, and a configuration module 1403 configured to configure the setting information of the terminal according to a setting information set of each category, where the setting information set includes a recommended setting information set and an improper setting information set.

Figure 15:
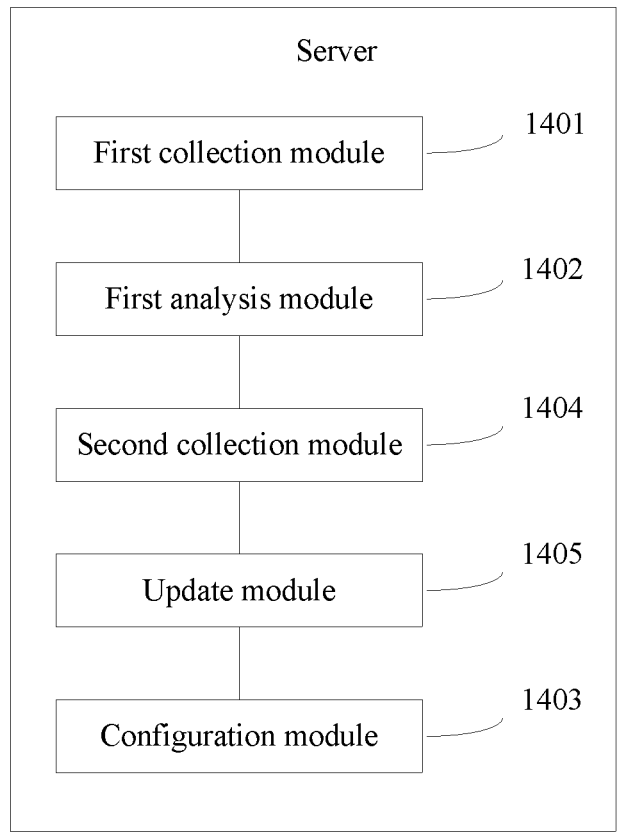
FIG. 15 is a schematic structural diagram of a server according to another embodiment of the present disclosure.

In an optional embodiment, based on the server shown in FIG. 14 and referring to FIG. 15, the server further includes a second collection module 1404 configured to collect setting information of each category, and an update module 1405 configured to update the corresponding recommended setting information set according to the collected setting information of each category.

The configuration module 1403 is configured to configure the setting information of the terminal according to the improper setting information set of each category and the updated recommended setting information set.

In an optional embodiment, the update module 1405 is configured to sort the collected setting information of each category and determine setting information that meets a preset counter condition, according to a preset counter, and update each piece of corresponding recommended setting information in the recommended setting information set according to each piece of setting information that meets the preset counter condition.

In an optional embodiment, the configuration module 1403 is configured to receive local setting information uploaded by the terminal, determine a category corresponding to the local setting information, determine an improper setting information set of the category corresponding to the local setting information, match the local setting information with the improper setting information set, set the matching information as improper setting information of a user when matching information exists between the local setting information and the improper setting information set, query, according to a correspondence between improper setting information and a setting suggestion, a setting suggestion corresponding to the improper setting information of the user, and return the improper setting information of the user and the setting suggestion to the terminal such that the terminal configures the setting information according to the improper setting information and the setting suggestion.

In an optional embodiment, the configuration module 1403 is configured to receive local setting information uploaded by the terminal, determine a category corresponding to the local setting information, determine a recommended setting information set of the category corresponding to the local setting information, and send the recommended setting information set to the terminal such that the terminal configures the setting information according to the recommended setting information set.

In an optional embodiment, the configuration module 1403 is configured to receive setting information uploaded by the terminal according to a preset period, determine a category corresponding to the setting information uploaded by the terminal, determine an improper setting information set of the category corresponding to the setting information uploaded by the terminal, and send the improper setting information set to the terminal such that after storing the improper setting information, the terminal configures the setting information according to the stored improper setting information set.

According to the server provided in this embodiment of the present disclosure, setting information and feature information of a terminal are obtained, cluster analysis is performed according to different feature information, to classify the setting information of the terminal to obtain a recommended setting information set and an improper setting information set of each category, and the setting information of the terminal is configured according to a setting information set of each category. Because local setting information can be purposefully configured according to the setting information set of each category, setting information configuration flexibility is relatively high.

Figure 16:
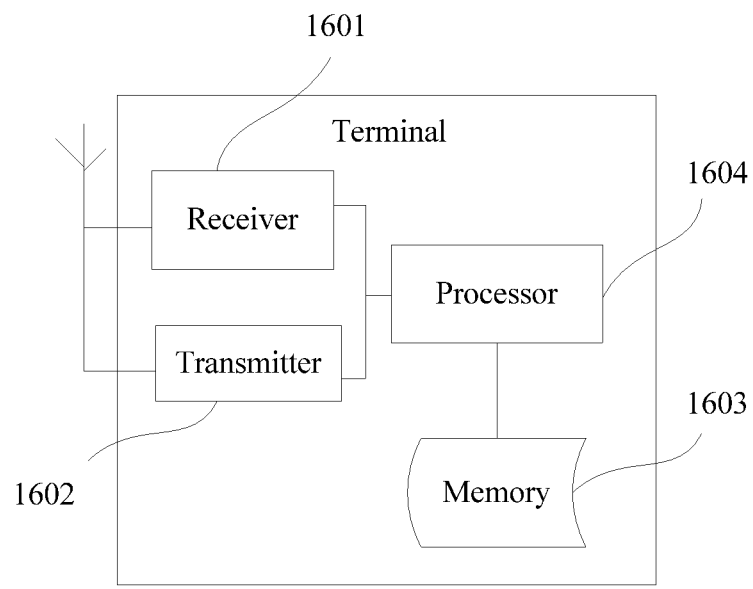
FIG. 16 is a schematic structural diagram of a terminal according to another embodiment of the present disclosure.

FIG. 16 is a schematic structural diagram of a terminal according to an embodiment of the present disclosure. Referring to FIG. 16, the terminal includes a receiver 1601, a transmitter 1602, a memory 1603, and a processor 1604. The receiver 1601, the transmitter 1602, and the memory 1603 are separately connected to the processor 1604, the memory 1603 stores program code, and the processor 1604 is configured to invoke the program code to perform the operations of obtaining an analysis result, where the analysis result is obtained after local setting information is analyzed according to an improper setting information set, the analysis result includes at least improper setting information of a user and a setting suggestion, and the improper setting information is setting information that causes negative impact on performance of the terminal, displaying the improper setting information of the user and the setting suggestion, receiving a setting instruction entered by the user according to the displayed improper setting information and setting suggestion, and configuring the local setting information according to the setting instruction.

In an optional embodiment, the processor 1604 is further configured to invoke the program code to perform the operations of uploading the local setting information to a server and receiving an analysis result returned by the server, where the analysis result is obtained after the server analyzes the local setting information according to the improper setting information set, or locally analyzing the local setting information according to the improper setting information set to obtain a corresponding analysis result.

In an optional embodiment, the processor 1604 is further configured to invoke the program code to perform the operations of matching the local setting information with a locally stored improper setting information set, where the improper setting information set includes at least one piece of improper setting information, setting the matching information as improper setting information of the user when matching information exists between the local setting information and the improper setting information set, and querying, according to a correspondence between improper setting information and a setting suggestion, a setting suggestion corresponding to the improper setting information of the user.

In an optional embodiment, the processor 1604 is further configured to invoke the program code to perform the following operations uploading setting information to the server at an interval of a preset period, and receiving an improper setting information set returned by the server according to the setting information and locally storing the improper setting information set.

In an optional embodiment, when the improper setting information is that a screen luminance value is greater than a first preset threshold, the setting suggestion is lowering the screen luminance value.

In an optional embodiment, when the improper setting information is that a quantity of calls during which BLUETOOTH is enabled is greater than a second preset threshold, the setting suggestion is disabling BLUETOOTH when a call is being made.

In an optional embodiment, the processor 1604 is further configured to invoke the program code to perform the operations of obtaining a recommended setting information set of the local setting information according to the local setting information, where the recommended setting information set includes at least one piece of recommended setting information, displaying a reminder of whether to accept the recommended setting information set, and configuring the local setting information according to the recommended setting information set when an instruction of the user for accepting the recommended setting information set is detected and it is identified that a current scenario is a preset scenario.

According to the terminal provided in this embodiment of the present disclosure, an analysis result obtained after local setting information is analyzed is obtained, improper setting information and a setting suggestion that are in the analysis result are displayed, a setting instruction entered by a user according to the displayed improper setting information and setting suggestion is received, and the local setting information is configured according to the setting instruction. Because the local setting information can be analyzed and the improper setting information and the setting suggestion that are obtained by means of analysis can be displayed, the user can purposefully configure the local setting information. Therefore, setting information configuration flexibility is relatively high.

Figure 17:
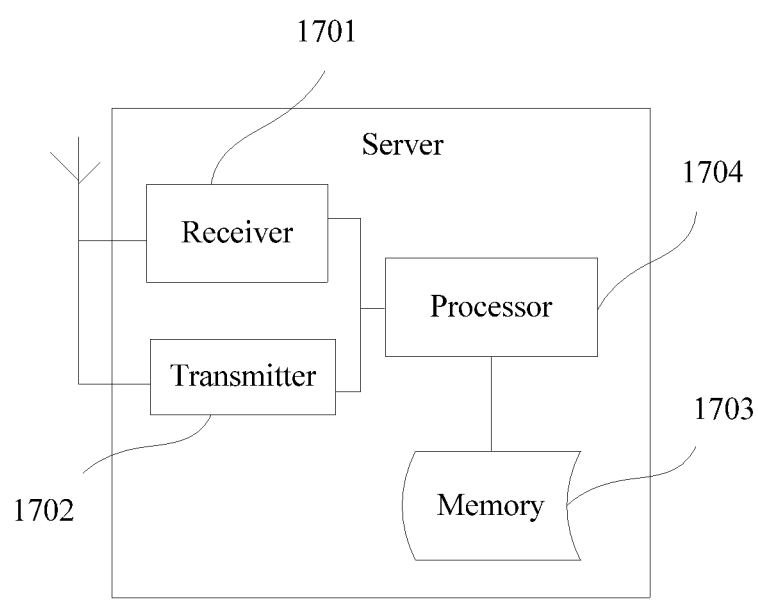
FIG. 17 is a schematic structural diagram of a server according to another embodiment of the present disclosure.

FIG. 17 is a schematic structural diagram of a server according to an embodiment of the present disclosure. Referring to FIG. 17, the server includes a receiver 1701, a transmitter 1702, a memory 1703, and a processor 1704. The receiver 1701, the transmitter 1702, and the memory 1703 are separately connected to the processor 1704, the memory 1703 stores program code, and the processor 1704 is configured to invoke the program code to perform the following operations collecting setting information and feature information of a terminal, where the feature information includes at least a terminal model, performing cluster analysis according to different feature information to classify the setting information of the terminal to obtain a recommended setting information set and an improper setting information set of each category, where improper setting information in the improper setting information set is setting information that causes negative impact on performance of the terminal, and configuring the setting information of the terminal according to a setting information set of each category, where the setting information set includes a recommended setting information set and an improper setting information set.

In an optional embodiment, the processor 1704 is further configured to invoke the program code to perform the operations of collecting setting information of each category, and updating the corresponding recommended setting information set according to the collected setting information of each category.

The configuring the setting information of the terminal according to a setting information set of each category includes configuring the setting information of the terminal according to the improper setting information set of each category and the updated recommended setting information set.

In an optional embodiment, the processor 1704 is further configured to invoke the program code to perform the operations of sorting the collected setting information of each category and determining setting information that meets a preset counter condition, according to a preset counter, and updating each piece of corresponding recommended setting information in the recommended setting information set according to each piece of setting information that meets the preset counter condition.

In an optional embodiment, the processor 1704 is further configured to invoke the program code to perform the operations of receiving local setting information uploaded by the terminal, determining a category corresponding to the local setting information, determining an improper setting information set of the category corresponding to the local setting information, matching the local setting information with the improper setting information set, and when matching information exists between the local setting information and the improper setting information set, using the matching information as improper setting information of a user, querying, according to a correspondence between improper setting information and a setting suggestion, a setting suggestion corresponding to the improper setting information of the user, and returning the improper setting information of the user and the setting suggestion to the terminal such that the terminal configures the setting information according to the improper setting information and the setting suggestion.

In an optional embodiment, the processor 1704 is further configured to invoke the program code to perform the operations of receiving local setting information uploaded by the terminal, determining a category corresponding to the local setting information, determining a recommended setting information set of the category corresponding to the local setting information, and sending the recommended setting information set to the terminal such that the terminal configures the setting information according to the recommended setting information set.

In an optional embodiment, the processor 1704 is further configured to invoke the program code to perform the operations of receiving setting information uploaded by the terminal according to a preset period, determining a category corresponding to the setting information uploaded by the terminal, determining an improper setting information set of the category corresponding to the setting information uploaded by the terminal, and sending the improper setting information set to the terminal such that after storing the improper setting information, the terminal configures the setting information according to the stored improper setting information set.

According to the server provided in this embodiment of the present disclosure, setting information and feature information of a terminal are obtained, cluster analysis is performed according to different feature information to classify the setting information of the terminal to obtain a recommended setting information set and an improper setting information set of each category, and the setting information of the terminal is configured according to a setting information set of each category. Because local setting information can be purposefully configured according to the setting information set of each category, setting information configuration flexibility is relatively high.

Optionally, an embodiment of the present disclosure provides a computer-readable storage medium that stores one or more programs. The one or more programs include an instruction, and when the instruction is being executed by a portable electronic device including multiple application programs, the portable electronic device performs the following operations obtaining an analysis result, where the analysis result is obtained after local setting information is analyzed according to an improper setting information set, the analysis result includes at least improper setting information of a user and a setting suggestion, and the improper setting information is setting information that causes negative impact on performance of a terminal, displaying the improper setting information of the user and the setting suggestion, receiving a setting instruction entered by the user according to the displayed improper setting information and setting suggestion, and configuring the local setting information according to the setting instruction. Further, the computer-readable storage medium may include one or more programs. The one or more programs include an instruction such that any method executed by a terminal in the foregoing embodiments is executed when an electronic device runs the instruction.

Optionally, an embodiment of the present disclosure further provides a computer-readable storage medium that stores one or more programs. The one or more programs include an instruction, and when the instruction is being executed by a server including multiple application programs, the server performs the operations of collecting setting information and feature information of a terminal, where the feature information includes at least a terminal model, performing cluster analysis according to different feature information, to classify the setting information of the terminal to obtain a recommended setting information set and an improper setting information set of each category, where improper setting information in the improper setting information set is setting information that causes negative impact on performance of the terminal, and configuring the setting information of the terminal according to a setting information set of each category, where the setting information set includes a recommended setting information set and an improper setting information set. Further, the computer-readable storage medium may include one or more programs. The one or more programs include an instruction such that any method executed by a server in the foregoing embodiments is executed when a server runs the instruction.

It should be noted that, during setting information configuration by the terminal and the server provided in the foregoing embodiments, description is given only using division of the foregoing functional modules. In practice, the functions may be allocated to different functional modules for implementation as required, that is, an internal structure of the terminal and the server is divided into different functional modules to implement all or some of the functions described above. In addition, the terminal and the server provided in the foregoing embodiments are based on the same inventive concept as the embodiments illustrating the setting information configuration method. For a specific implementation process, refer to the method embodiments, and details are not described herein again.

A person of ordinary skill in the art may understand that all or some of the steps of the embodiments may be implemented by hardware or a program instructing related hardware. The program may be stored in a computer-readable storage medium. The storage medium may include a read-only memory (ROM), a magnetic disk, or an optical disc.

The foregoing descriptions are merely examples of embodiments of the present disclosure, but are not intended to limit the present disclosure. Any modification, equivalent replacement, and improvement made without departing from the spirit and principle of the present disclosure shall fall within the protection scope of the present disclosure.

What is claimed is:

1. A setting information configuration method, implemented by a terminal, the setting information configuration method comprising:
obtaining, by the terminal, an analysis result, wherein the analysis result is obtained after local setting information of the terminal is analyzed according to an improper setting information set, wherein the analysis result comprises at least improper setting information input by a user and a setting suggestion, wherein the improper setting information causes greater power consumption to the terminal, and wherein the setting suggestion comprises lowering a screen luminance value when the improper setting information comprises that the screen luminance value is greater than a first preset threshold;
displaying, by the terminal, the improper setting information and the setting suggestion;
receiving, by the terminal, a setting instruction from the user according to the displayed improper setting information and the setting suggestion; and
configuring, by the terminal, the local setting information according to the setting instruction.

2. The setting information configuration method of claim 1, wherein obtaining the analysis result comprises uploading the local setting information to a server and receiving the analysis result returned by the server, wherein the analysis result is obtained after the server analyzes the local setting information according to the improper setting information set.

3. The setting information configuration method of claim 2, wherein locally analyzing the local setting information comprises:
matching the local setting information with a locally stored improper setting information set, wherein the locally stored improper setting information set comprises at least one piece of improper setting information;
setting matching information as the improper setting information of the user when the matching information exists between the local setting information and the locally stored improper setting information set; and
querying, according to a correspondence between improper setting information and a setting suggestion, a setting suggestion corresponding to the improper setting information of the user.

4. The setting information configuration method of claim 3, wherein before matching the local setting information with the locally stored improper setting information set, the method further comprises:
uploading setting information to the server at an interval of a preset period;
receiving an improper setting information set returned by the server according to the setting information; and
locally storing the improper setting information set returned by the server.

5. The setting information configuration method of claim 1, further comprising:
obtaining a recommended setting information set of the local setting information according to the local setting information, wherein the recommended setting information set comprises at least one piece of recommended setting information;
displaying a reminder of whether to accept the recommended setting information set; and
configuring the local setting information according to the recommended setting information set when an instruction of the user for accepting the recommended setting information set is detected and it is identified that a current scenario is a preset scenario.

6. The setting information configuration method of claim 1, wherein obtaining the analysis result comprises locally analyzing the local setting information according to the improper setting information set to obtain the analysis result.

7. A setting information configuration method, implemented by a terminal, the setting information configuration method comprising:
collecting, by the terminal, setting information and feature information of the terminal, wherein the feature information comprises at least a terminal model;
performing, by the terminal, cluster analysis according to different feature information to classify the setting information of the terminal to obtain a recommended setting information set and an improper setting information set of each category, wherein improper setting information in the improper setting information set causes greater power consumption to the terminal, and wherein the recommended setting information set comprises lowering a screen luminance value when the improper setting information set comprises that the screen luminance value is greater than a first preset threshold; and
configuring, by the terminal, the setting information of the terminal according to a setting information set of each category, wherein the setting information set of each category comprises the recommended setting information set and the improper setting information set of each category.

8. The setting information configuration method of claim 7, wherein before configuring the setting information of the terminal, the method further comprises:
collecting setting information of each category; and
updating a corresponding recommended setting information set according to the collected setting information of each category, and
wherein configuring the setting information of the terminal comprises configuring the setting information of the terminal according to the improper setting information set of each category and the updated recommended setting information set.

9. The setting information configuration method of claim 8, wherein updating the corresponding recommended setting information set comprises:

sorting the collected setting information of each category;
determining setting information meeting a preset counter condition according to a preset counter; and
updating each piece of corresponding recommended setting information in the recommended setting information set according to each piece of setting information meeting the preset counter condition.

10. The setting information configuration method of claim 7, wherein configuring the setting information of the terminal comprises:
receiving local setting information uploaded by the terminal;
determining a category corresponding to the local setting information;
determining an improper setting information set of the category corresponding to the local setting information;
matching the local setting information with the improper setting information set of the category corresponding to the local setting information;
setting matching information as improper setting information of a user when matching information exists between the local setting information and the improper setting information set of the category corresponding to the local setting information;
querying, according to a correspondence between improper setting information and a setting suggestion, a setting suggestion corresponding to the improper setting information of the user; and
returning the improper setting information of the user and the corresponding setting suggestion to the terminal.

11. The setting information configuration method of claim 7, wherein configuring the setting information of the terminal comprises:
receiving local setting information uploaded by the terminal;
determining a category corresponding to the local setting information;
determining a recommended setting information set of the category corresponding to the local setting information; and
sending the recommended setting information set of the category corresponding to the local setting information to the terminal.

12. The setting information configuration method of claim 7, wherein configuring the setting information of the terminal comprises:
receiving setting information uploaded by the terminal according to a preset period;
determining a category corresponding to the setting information uploaded by the terminal;
determining an improper setting information set of the category corresponding to the setting information uploaded by the terminal; and
sending the improper setting information set of the category corresponding to the setting information uploaded by the terminal to the terminal.

13. A terminal, comprising:
a processor;
a receiver coupled to the processor;
a transmitter coupled to the processor;
a memory coupled to the processor and storing programming instructions that, when executed by the processor, cause the processor to be configured to:
obtain an analysis result, wherein the analysis result is obtained after local setting information of the terminal is analyzed according to an improper setting information set, wherein the analysis result comprises at least improper setting information input by a user and a setting suggestion, wherein the improper setting information causes a greater power consumption to the terminal, and wherein the setting suggestion comprises lowering a screen luminance value when the improper setting information comprises that the screen luminance value is greater than a first preset threshold;

display the improper setting information and the setting suggestion;

receive, using the receiver, a setting instruction from the user according to the displayed improper setting information and the setting suggestion; and configure the local setting information according to the setting instruction.

14. The terminal of claim 13, wherein the programming instructions further cause the processor to be configured to upload, using the transmitter, the local setting information to a server and receive the analysis result returned by the server, wherein the analysis result is obtained after the server analyzes the local setting information according to the improper setting information set.

15. The terminal of claim 14, wherein the programming instructions further cause the processor to be configured to:

match the local setting information with a locally stored improper setting information set, wherein the locally stored improper setting information set comprises at least one piece of improper setting information;

set matching information as the improper setting information of the user when the matching information exists between the local setting information and the locally stored improper setting information set; and query, according to a correspondence between improper setting information and a setting suggestion, a setting suggestion corresponding to the improper setting information of the user.

16. The terminal of claim 15, wherein the programming instructions further cause the processor to be configured to:

upload, using the transmitter, setting information to the server at an interval of a preset period;

receive, using the receiver, an improper setting information set returned by the server according to the setting information; and locally store the improper setting information set returned by the server.

17. The terminal of claim 13, wherein the programming instructions further cause the processor to be configured to:

obtain a recommended setting information set of the local setting information according to the local setting information, wherein the recommended setting information set comprises at least one piece of recommended setting information;

display a reminder of whether to accept the recommended setting information set; and configure the local setting information according to the recommended setting information set when an instruction of the user hr accepting the recommended setting information set is detected and it is identified that a current scenario is a preset scenario.

18. The terminal of claim 13, wherein the programming instructions further cause the processor to be configured to locally analyze the local setting information according to the improper setting information set to obtain the analysis result.

* * * * *

UNITED STATES PATENT AND TRADEMARK OFFICE
CERTIFICATE OF CORRECTION

PATENT NO.       : 10,462,746 B2
APPLICATION NO.  : 15/805942
DATED            : October 29, 2019
INVENTOR(S)      : Yanhui Yu et al.

Page 1 of 1

It is certified that error appears in the above-identified patent and that said Letters Patent is hereby corrected as shown below:

Claim 18, Column 38, Line 25: "user hr accepting" should read "user for accepting"

Signed and Sealed this
Tenth Day of December, 2019

Andrei Iancu
*Director of the United States Patent and Trademark Office*